(12) United States Patent
Xia et al.

(10) Patent No.: US 10,545,268 B2
(45) Date of Patent: Jan. 28, 2020

(54) RETROREFLECTIVE ARTICLES

(71) Applicant: 3M INNOVATIVE PROPERTIES COMPANY, St. Paul, MN (US)

(72) Inventors: Ying Xia, Woodbury, MN (US); Shri Niwas, Maple Grove, MN (US); Michael A. McCoy, Minneapolis, MN (US); Yongshang Lu, Woodbury, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 248 days.

(21) Appl. No.: 15/308,853

(22) PCT Filed: Apr. 30, 2015

(86) PCT No.: PCT/US2015/028388
§ 371 (c)(1),
(2) Date: Nov. 4, 2016

(87) PCT Pub. No.: WO2015/171405
PCT Pub. Date: Nov. 12, 2015

(65) Prior Publication Data
US 2017/0131444 A1    May 11, 2017

Related U.S. Application Data

(60) Provisional application No. 61/990,958, filed on May 9, 2014.

(51) Int. Cl.
*G02B 5/12* (2006.01)
*G02B 5/128* (2006.01)
(Continued)

(52) U.S. Cl.
CPC ............. *G02B 5/128* (2013.01); *A41D 13/01* (2013.01); *A41D 27/085* (2013.01); *B32B 37/12* (2013.01);
(Continued)

(58) Field of Classification Search
CPC .... G02B 5/128; G02B 5/0825; G02B 5/0883; G02B 1/04; A41D 13/01; A41D 27/085;
(Continued)

(56) References Cited

U.S. PATENT DOCUMENTS 1,175,224 A    3/1916    Bleecker
2,461,011 A    2/1949    Taylor
(Continued)

FOREIGN PATENT DOCUMENTS

EP    0615788    9/1994
EP    1431449    6/2004
(Continued)

OTHER PUBLICATIONS

Chopra, "Thin Film Phenomena", McGraw-Hill Book Company, Optical Properties of Thin Films, 1969, pp. 740-757.
(Continued)

*Primary Examiner* — Euncha P Cherry
(74) *Attorney, Agent, or Firm* — Jeffrey M. Olofson

(57) ABSTRACT

Retroreflective articles include a layer of optical elements, and a bead bond layer (140). The optical elements include transparent microspheres (110), a transparent polymeric polyurethane layer (120), and at least one reflective layer (130), where the transparent polymeric polyurethane layer (120) comprises a dried layer prepared from an aqueous polyurethane dispersion. The retroreflective articles have improved wash durability.

23 Claims, 3 Drawing Sheets

(51) Int. Cl.
*A41D 13/01* (2006.01)
*A41D 27/08* (2006.01)
*B32B 37/12* (2006.01)
*G02B 1/04* (2006.01)

(52) U.S. Cl.
CPC ............ *G02B 1/04* (2013.01); *B32B 2305/18* (2013.01); *B32B 2551/00* (2013.01)

(58) Field of Classification Search
CPC .. B32B 37/12; B32B 2305/18; B32B 2551/00
USPC ....................................................... 359/518
See application file for complete search history.

(56) References Cited

U.S. PATENT DOCUMENTS

| | | | |
|---|---|---|---|
| 2,726,161 A | 12/1955 | Beck | |
| 2,842,446 A | 7/1958 | Beck | |
| 2,853,393 A | 9/1958 | Beck | |
| 2,870,030 A | 1/1959 | Stradley | |
| 2,939,797 A | 6/1960 | Rindone | |
| 2,965,921 A | 12/1960 | Bland | |
| 2,992,122 A | 7/1961 | Beck | |
| 3,468,681 A | 9/1969 | Jaupain | |
| 3,700,305 A | 10/1972 | Bingham | |
| 3,946,130 A | 3/1976 | Tung | |
| 4,192,576 A | 3/1980 | Tung | |
| 4,367,919 A | 1/1983 | Tung | |
| 4,564,556 A | 1/1986 | Lange | |
| 4,567,228 A | 1/1986 | Gaa | |
| 4,758,469 A | 7/1988 | Lange | |
| 4,763,985 A | 8/1988 | Bingham | |
| 4,772,511 A | 9/1988 | Wood | |
| 4,844,976 A * | 7/1989 | Huang | G02B 1/105 428/323 |
| 4,931,414 A | 6/1990 | Wood | |
| 5,200,262 A | 4/1993 | Li | |
| 5,283,101 A | 2/1994 | Li | |
| 5,474,827 A | 12/1995 | Crandall | |
| 5,554,686 A | 9/1996 | Frisch, Jr. | |
| 5,620,775 A | 4/1997 | LaPerre | |
| 5,812,317 A | 9/1998 | Billingsley | |
| 6,046,295 A | 4/2000 | Frisch, Jr. | |
| 6,153,128 A | 11/2000 | Lightle | |
| 6,361,850 B1 | 3/2002 | Billingsley | |
| 6,533,961 B2 | 3/2003 | Harelstad | |
| 7,111,949 B2 | 9/2006 | Parisi | |
| 7,700,082 B2 | 4/2010 | Mallo | |
| 8,256,025 B2 | 9/2012 | Feduzi | |
| 2005/0030630 A1 | 2/2005 | Ohnishi | |
| 2006/0072198 A1* | 4/2006 | Parisi | D06P 1/0012 359/536 |
| 2010/0238552 A1 | 9/2010 | Tsai | |
| 2011/0045176 A1 | 2/2011 | Koppes | |
| 2011/0292508 A1 | 12/2011 | Huang | |
| 2014/0037890 A1* | 2/2014 | McJunkins | C09D 5/028 428/90 |

FOREIGN PATENT DOCUMENTS

| | | |
|---|---|---|
| EP | 1468619 | 10/2004 |
| EP | 1584738 | 10/2005 |
| JP | 2002-266149 | 9/2002 |
| JP | 2005-105222 | 4/2005 |
| TW | 514660 | 12/2002 |
| WO | WO 1994-13723 | 6/1994 |
| WO | WO 2000-36208 | 6/2000 |

OTHER PUBLICATIONS

International Search Report for PCT International Application No. PCT/US2015/028388, dated Jul. 29, 2015, 5 pages.

* cited by examiner

RETROREFLECTIVE ARTICLES

FIELD OF THE DISCLOSURE

This disclosure relates to retroreflective articles, especially colored retroreflective articles and methods of making and using them.

BACKGROUND

A wide variety of articles that incorporate the phenomenon of retroreflectivity have been developed for a wide array of uses. Retroreflective articles have the ability to return a substantial portion of incident light back towards the light source. This unique ability has promoted widespread use of retroreflective safety articles. Besides traffic and warning signs and the like, a wide variety of clothing and similar articles such as backpacks, and the like have incorporated retroreflective articles into them. Persons who work or exercise near motor vehicle traffic need to be conspicuously visible so that they do not get struck by passing motor vehicles. When retroreflective articles are worn, the retroreflectivity highlights a person's presence by retroreflecting light from motor vehicle headlamps.

Retroreflective articles typically have an optical lens element layer, a polymeric bead bond layer, a reflective layer, and may also have a substrate layer. The optical lens elements commonly are microspheres that are partially embedded in the polymeric bead bond layer. The reflective layer typically is aluminum, silver, or a dielectric mirror that usually is disposed on the embedded portions of the microspheres. Light striking the front surface of the retroreflective article passes through the microspheres and is reflected by the reflective layer to re-enter the microspheres where the light's direction is then altered to travel back towards the light source. Thus, for example, when a vehicle's headlamps strike a retroreflective article, some of the light from the headlamps is reflected back to the driver of the vehicle.

It is generally not necessary, or even desirable, that an entire worn article be retroreflective, so retroreflective appliqués are often used. These retroreflective appliqués can then be attached to an article of clothing or other article to prepare a retroreflective article. In some instances, retroreflective appliqués have been made by partially embedding a microsphere layer in a thermoplastic carrier web, applying a reflective material over the microspheres' protruding portions, and then forming a bead bond layer over the coated microspheres. Often a pressure sensitive adhesive is applied on the bead bond layer's back surface, and a release liner is placed over the adhesive until the appliqué is secured to a substrate. The completed appliqué (also sometimes referred to as a transfer sheet) is supplied to a garment assembler in this form, and the garment assembler secures the appliqué to an article of clothing by removing the release liner and adhering the appliqué to an outer surface of the article of clothing. The carrier is then separated from the appliqué to expose the microspheres so that the appliqué can retroreflect light.

A number of retroreflective articles have been prepared and described. For example, in U.S. Pat. No. 6,153,128 (Lightle et al.), retroreflective articles are described with first and second segments, each comprising a binder layer and a multitude of microspheres embedded in the front surface of the binder layer. The first segment has an opaque reflective metal layer disposed on the embedded portions of the microspheres, whereas the second segment lacks such an opaque reflective layer and thereby allows the color of the underlying binder layer to be seen. US Patent Publication No. 2011/0292508 (Huang et al.) describes an exposed lens retroreflective article that includes a binder layer, a layer of spaced apart optical elements that are partially embedded in the binder layer, a penetrated colored layer that is located between the spaced apart optical elements, and a reflective layer that is located functionally behind the layer of optical elements and the penetrated colored layer.

SUMMARY

Disclosed herein are retroreflective articles, especially colored retroreflective articles, and methods of making and using them. In some embodiments, the retroreflective articles comprise a layer of optical elements, and a bead bond layer. The optical elements comprise transparent microspheres, a transparent polymeric polyurethane layer, and at least one reflective layer, where the transparent polymeric polyurethane layer comprises a dried layer prepared from an aqueous polyurethane dispersion.

Also disclosed are articles of clothing comprising a fabric with a first major surface and a second major surface, and a retroreflective appliqué attached to the first major surface of the fabric, the retroreflective appliqué comprising a layer of optical elements, and a bead bond layer. The optical elements comprise transparent microspheres, a transparent polymeric polyurethane layer, and at least one reflective layer, where the transparent polymeric polyurethane layer comprises a dried layer prepared from an aqueous polyurethane dispersion.

Also disclosed are methods of preparing retroreflective articles comprising providing a polymeric carrier layer with a first major surface and a second major surface, providing transparent microspheres, partially embedding the transparent microspheres into the first major surface of the polymeric carrier layer such that the beads at least partially protrude from the first major surface of the polymeric carrier layer to form a layer of microspheres, depositing a coating composition comprising a an aqueous polyurethane dispersion on the layer of microspheres, drying the coating composition to form a transparent polyurethane polymeric layer on the layer of transparent microspheres, depositing one or more reflective layers on at least a portion of the first major surface of the polymeric carrier layer and the layer of microspheres, applying a bead bond layer to the layer of microspheres, and removing the polymeric carrier layer.

Also disclosed are intermediate articles. Intermediate articles are the articles prepared by the methods described above, in which the polymeric carrier layer has not yet been removed. The intermediate articles include articles comprising a polymeric carrier layer with a first major surface and a second major surface, a layer of optical elements, partially embedded in the first major surface of the polymeric carrier layer, and a bead bond layer disposed on the layer of optical elements. The optical elements comprise transparent microspheres, a transparent polymeric polyurethane layer, and at least one reflective layer. The transparent polymeric polyurethane layer comprises a dried layer prepared from an aqueous polyurethane dispersion.

BRIEF DESCRIPTION OF THE DRAWINGS

The present application may be more completely understood in consideration of the following detailed description of various embodiments of the disclosure in connection with the accompanying drawings.

Figure 1:
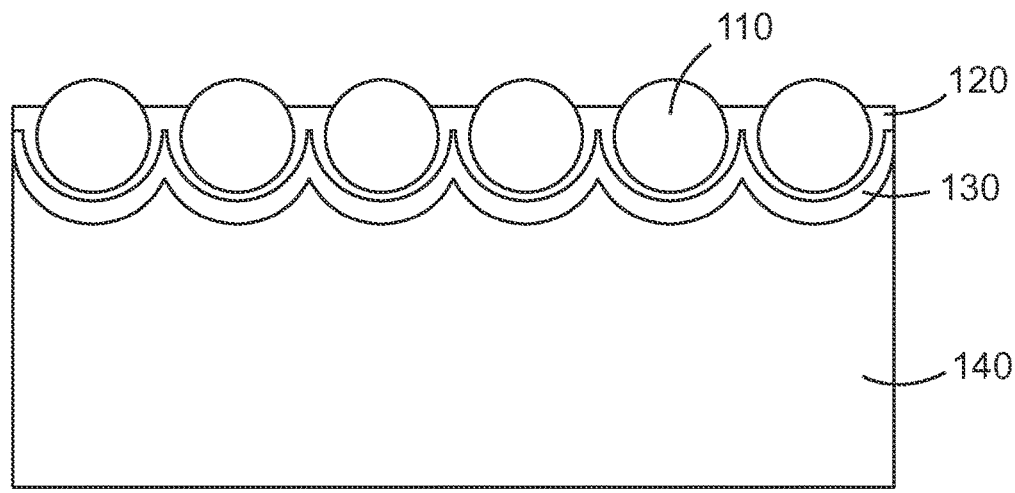
FIG. 1 shows a cross-sectional view of an embodiment of an article of this disclosure.

In the following description of the illustrated embodiments, reference is made to the accompanying drawings, in which is shown by way of illustration, various embodiments in which the disclosure may be practiced. It is to be understood that the embodiments may be utilized and structural changes may be made without departing from the scope of the present disclosure. The figures are not necessarily to scale. Like numbers used in the figures refer to like components. However, it will be understood that the use of a number to refer to a component in a given figure is not intended to limit the component in another figure labeled with the same number.

DETAILED DESCRIPTION

The desirability of making a wide variety of articles retroreflective has led to the increasing use of retroreflective articles. In some applications, an entire article may be made retroreflective; in others a portion of the article may be made retroreflective through the use of one or more retroreflective appliqués. The retroreflective articles typically have an optical element layer, a polymeric bead bond layer, and a reflective layer. The optical elements commonly are microspheres that are partially embedded in the polymeric bead bond layer. The reflective layer typically is aluminum, silver, or a dielectric mirror that usually is disposed on the embedded portions of the microspheres. Light striking the front surface of the retroreflective article passes through the microspheres and is reflected by the reflective layer to re-enter the microspheres where the light's direction is then altered to travel back towards the light source. Thus, for example, when a vehicle's headlamps strike a retroreflective article, some of the light from the headlamps is reflected back to the driver of the vehicle. This permits the driver of the vehicle to be aware of the person wearing the retroreflective article long before the driver would see the person if he or she were not wearing the retroreflective article. These retroreflective articles and appliqués can be attached to a wide range of articles, including everything from bicycles and motorized vehicles to a wide range of clothing such as jackets, vests, shirts, shoes, hats, and the like.

A variety of articles are retroreflective or have retroreflective appliqués that combine retroreflectivity with bright or fluorescent colors. Often articles have strips of retroreflective material and adjacent stripes of bright or fluorescent colors. In this way the articles provide high visibility in daylight due to the brightly colored or fluorescent strips and also are retroreflective for high visibility at night. An example is an article having two fluorescent yellow strips with a retroreflective strip located between the fluorescent yellow strips.

To even further increase the visibility it would be desirable to have retroreflective articles that have strips that are retroreflective and other strips that have bright and fluorescent colors for high visibility in daylight, but where the strips that have bright or fluorescent colors also are retroreflective. In this way, not only does the article have high visibility in daylight due to the bright or fluorescent colors, but the article has greater night visibility due to the increased retroreflectivity. This increased retroreflectivity not only enhances safety by increasing the visibility of the wearer, it also permits the use of smaller retroreflective articles to achieve this enhanced visibility. For example, if retroreflective appliqués are used to enhance the night visibility of an article of clothing, fewer appliqués or smaller appliqués can be used.

However, making an article both entirely retroreflective as well as highly colored, is difficult to achieve because of the way that retroreflective articles are made and how retroreflectivity is achieved. Typically retroreflective articles are prepared in a multi-step process. In this process, a thermoplastic polymeric carrier layer has a plurality of transparent microspheres partially embedded in it. A reflective layer, typically a reflective metal layer such as aluminum, silver or the like, is applied to the protruding transparent microspheres. A bead bond layer is applied to the coated microsphere layer, a transfer adhesive or fabric may be adhered to the bead bond layer, and the thermoplastic polymeric carrier layer is removed to generate the retroreflective article. When the article is colored, the coloring agent, either a pigment, a dye or a combination thereof, is placed in the bead bond layer. Because the reflective metal layer is a mirror, when viewed through the transparent microspheres the colored bead bond layer is not visible. Therefore, regions that are retroreflective do not show the color, and regions that show the color, because there is no reflective metal layer on the beads, are not retroreflective.

In this disclosure, articles are described that have a protective transparent polyurethane polymeric layer that provides protection to the retroreflective layer and enhances the durability of the retroreflective article, especially the wash durability of the retroreflective article. Since it is desirable that the articles that are made retroreflective be washable, wash durability is particularly important. By wash durability it is meant the number of times that the article can be laundered without losing its retroreflective performance. In addition, especially in retroreflective articles in which the reflective layer is a dielectric reflective layer, the protective transparent polyurethane polymeric layer provides additional benefits beyond protecting the reflective layer and enhancing the wash durability of the retroreflective article. Among these additional benefits are a variety of optical benefits such as increasing the retroreflectivity of the article (when compared to an identical article which lacks the transparent polyurethane polymeric layer). Also, articles with the protective transparent polyurethane polymeric layer have a decreased dichroic effect when compared to an identical article which lacks the transparent polyurethane polymeric layer. Additionally, when the reflective layer is a multi-layer dielectric reflecting layer comprising alternating layers of low refractive index material and high refractive index material, the protective transparent polyurethane polymeric layer functions not only as a protective layer, but also as a low refractive index layer component of the multi-layer dielectric reflective layer. All of these effects will be discussed in greater detail below.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The recitation of numerical ranges by endpoints includes all numbers subsumed within that range (e.g. 1 to 5 includes 1, 1.5, 2, 2.75, 3, 3.80, 4, and 5) and any range within that range.

As used in this specification and the appended claims, the singular forms "a", "an", and "the" encompass embodiments having plural referents, unless the content clearly dictates otherwise. For example, reference to "a layer" encompasses embodiments having one, two or more layers. As used in this specification and the appended claims, the term "or" is generally employed in its sense including "and/or" unless the content clearly dictates otherwise.

The term "adhesive" as used herein refers to polymeric compositions useful to adhere together two adherends. Examples of adhesives are pressure sensitive adhesives, heat activated adhesives and laminating adhesives.

Pressure sensitive adhesive compositions are well known to those of ordinary skill in the art to possess properties including the following: (1) aggressive and permanent tack at room temperature, (2) adherence with no more than finger pressure, (3) sufficient ability to hold onto an adherend, and (4) sufficient cohesive strength to be cleanly removable from the adherend. Materials that have been found to function well as pressure sensitive adhesives are polymers designed and formulated to exhibit the requisite viscoelastic properties resulting in a desired balance of tack, peel adhesion, and shear holding power. Obtaining the proper balance of properties is not a simple process.

Heat activated adhesives are non-tacky at room temperature but become tacky and capable of bonding to a substrate at elevated temperatures. These adhesives usually have a Tg or melting point (Tm) above room temperature. When the temperature is elevated above the Tg or Tm, the storage modulus usually decreases and the adhesive become tacky.

Laminating adhesives (also sometimes referred to as contact adhesives) are adhesives designed to form bonds to two substrates immediately after dispensing. Once the adhesive has been dispensed, there is a limited time, sometimes referred to as "open time" in which the adhesive can form a bond to two substrates. Once the open time has elapsed, the laminating adhesive is no longer capable of forming adhesive bonds. Examples of laminating adhesives are hot melt adhesives, solutions or dispersions of polymeric materials or materials curable to form polymeric materials in a liquid medium, and curable adhesives. The laminating adhesive is coated onto a substrate, a second substrate is contacted to the adhesive surface and the formed three layer construction is cooled, dried, and/or cured to form a laminate. Examples of laminating adhesives include the glue sticks used in hot glue guns (which are hot melt types of adhesives that form bonds upon cooling), casein glues, sometimes called "white glue", (which are water-borne dispersions that form bonds upon drying), and cyanoacrylate adhesives (which cure to form bonds upon exposure to air).

Unless otherwise indicated, the terms "transparent" and "optically transparent" are used interchangeably and refer to an article, film or adhesive that has a high light transmittance over at least a portion of the visible light spectrum (about 400 to about 700 nm). By high light transmittance over at least a portion of the visible light spectrum it is meant at least 50% transmittance, in some embodiments at least 70% transmittance, or even greater than 90% transmittance.

As used herein, the term "polymer" refers to a polymeric material that is a homopolymer or a copolymer. As used herein, the term "homopolymer" refers to a polymeric material that is the reaction product of one monomer. As used herein, the term "copolymer" refers to a polymeric material that is the reaction product of at least two different monomers.

The term "alkyl" refers to a monovalent group that is a radical of an alkane, which is a saturated hydrocarbon. The alkyl can be linear, branched, cyclic, or combinations thereof and typically has 1 to 20 carbon atoms. In some embodiments, the alkyl group contains 1 to 18, 1 to 12, 1 to 10, 1 to 8, 1 to 6, or 1 to 4 carbon atoms. Examples of alkyl groups include, but are not limited to, methyl, ethyl, n-propyl, isopropyl, n-butyl, isobutyl, tert-butyl, n-pentyl, n-hexyl, cyclohexyl, n-heptyl, n-octyl, and ethylhexyl.

The term "aryl" refers to a monovalent group that is aromatic and carbocyclic. The aryl can have one to five rings that are connected to or fused to the aromatic ring. The other ring structures can be aromatic, non-aromatic, or combinations thereof. Examples of aryl groups include, but are not limited to, phenyl, biphenyl, terphenyl, anthryl, naphthyl, acenaphthyl, anthraquinonyl, phenanthryl, anthracenyl, pyrenyl, perylenyl, and fluorenyl.

The term "alkylene" refers to a divalent group that is a radical of an alkane. The alkylene can be straight-chained, branched, cyclic, or combinations thereof. The alkylene often has 1 to 20 carbon atoms. In some embodiments, the alkylene contains 1 to 18, 1 to 12, 1 to 10, 1 to 8, 1 to 6, or 1 to 4 carbon atoms. The radical centers of the alkylene can be on the same carbon atom (i.e., an alkylidene) or on different carbon atoms. The alkylene group may also be substituted with one or more alkyl or aryl groups.

The term "arylene" refers to a divalent group that is carbocyclic and aromatic. The group has one to five rings that are connected, fused, or combinations thereof. The other rings can be aromatic, non-aromatic, or combinations thereof. In some embodiments, the arylene group has up to 5 rings, up to 4 rings, up to 3 rings, up to 2 rings, or one aromatic ring. For example, the arylene group can be phenylene. The arylene group may also be substituted with one or more alkyl or aryl groups.

The term "alkoxy" refers to a monovalent group of the formula —OR, where R is an alkyl group.

As used herein the terms "thermoplastic", "non-thermoplastic", and "thermoset", refer to properties of materials. Thermoplastic materials are materials which melt and/or flow upon the application of heat, resolidify upon cooling and again melt and/or flow upon the application of heat. The thermoplastic material undergoes only a physical change upon heating and cooling, no appreciable chemical change occurs. Non-thermoplastic materials are materials that do not flow upon the application of heat up to a temperature where the material begins to degrade. Thermoset materials, are curable materials that irreversibly cure, such as becoming crosslinked, when heated or cured. Once cured, the thermoset material will not appreciably melt or flow upon application of heat.

Disclosed herein are methods of preparing retroreflective articles. These methods comprise providing a polymeric carrier layer with a first major surface and a second major surface, providing transparent microspheres, partially embedding the transparent microspheres into the first major surface of the polymeric carrier layer such that the beads at least partially protrude from the first major surface of the polymeric carrier layer to form a layer of microspheres, depositing a coating composition comprising an aqueous polyurethane dispersion on the layer of microspheres, drying the coating composition to form a transparent polyurethane polymeric layer on the layer of transparent microspheres, depositing one or more reflective layers on at least a portion of the first major surface of the polymeric carrier layer and the layer of microspheres, and applying a bead bond layer to the layer of microspheres. The bead bond layer may be a transparent bead bond layer or the bead bond layer may be a colored bead bond layer. The colored bead bond layer contains pigment, dye, or a combination thereof. The thus formed article is an intermediate article and can be transformed into a retroreflective article by removing the polymeric carrier layer.

In some embodiments, depositing a first reflective layer on at least a portion of the first major surface of the polymeric carrier layer and the layer of microspheres comprises depositing a layer of reflective metal to a selected portion of the layer of microspheres. This selective deposition can be achieved in a variety of ways, for example, portions of the surface can be masked to prevent the deposition of the metal. In other embodiments, depositing a first reflective layer on at least a portion of the first major surface of the polymeric carrier layer comprises depositing one or more layers of dielectric material on a selected portion of the layer of microspheres. Generally, multiple layers of dielectric material are deposited to form the dielectric reflecting layer, which is sometimes called a dielectric mirror. When the depositing of a reflective layer (whether a reflective metal layer or a reflective dielectric layer) is said to be deposited on the layer of transparent microspheres, of course the deposition is occurring not directly on the transparent microspheres but on the transparent polymeric layer that is covering the transparent microspheres. Since a region of selective deposition refers to the microspheres of that region, the deposition is described as being on the microspheres, with the understanding that the transparent polymeric layer is present on the microspheres.

A wide variety of materials are suitable for use in the methods described above. Examples of these materials are described below.

A wide variety of materials and combinations of materials are suitable for the polymeric carrier layer. In many embodiments the polymeric carrier layer is a thermoplastic polymeric carrier layer, but in other embodiments the polymeric carrier layer may comprise an elastomeric polymeric carrier layer, and in some embodiments may even be a pressure sensitive adhesive or a heat activated adhesive. Typically the polymeric carrier layer comprises a thermoplastic polymeric carrier layer. In some embodiments, the thermoplastic polymeric carrier layer may be a standalone layer; in other embodiments the thermoplastic polymeric carrier layer may comprise a coating of thermoplastic polymeric carrier material on the first major surface of a sheet. The sheet may comprise, for example, paper, a polymeric film, and the like. Examples of useful polymeric carrier materials include polyvinyl chloride, polysulfones, polyalkylenes such as polyethylene, polypropylene and polybutylene, polyesters, and the like.

A layer of partially embedded transparent microspheres is formed on the surface of the polymeric carrier layer. The monolayer of transparent microspheres is assembled by cascading transparent microspheres onto the polymeric carrier layer, which secures the microspheres in a desired temporary assignment. Typically, the polymeric carrier layer is heat softened. The microspheres are generally packed as closely as possible, ideally in their closest hexagonal arrangement, to achieve very good retroreflective brightness and may be so arranged by any convenient application process, such as printing, screening, cascading, or hot rolling. Upon cooling, the polymeric carrier layer retains the microspheres in a desired arrangement.

Typically, the transparent microspheres are substantially spherical in shape in order to provide the most uniform and efficient retroreflection. The microspheres are substantially transparent so as to minimize absorption of light so that a large percentage of the incident light is retroreflected. The microspheres often are substantially colorless but may be tinted or colored in some other fashion.

The microspheres may be made from glass, a non-vitreous ceramic composition, or a synthetic resin. Glass and ceramic microspheres are particularly suitable because they tend to be harder and more durable than microspheres made from synthetic resins. Examples of microspheres that may be used are described in the following U.S. Pat. Nos. 1,175,224, 2,461,011, 2,726,161, 2,842,446, 2,853,393, 2,870,030, 2,939,797, 2,965,921, 2,992,122, 3,468,681, 3,946,130, 4,192,576, 4,367,919, 4,564,556, 4,758,469, 4,772,511, and 4,931,414.

The microspheres typically have an average diameter in the range of about 30 to 200 micrometers. Microspheres smaller than this range tend to provide lower levels of retroreflection, and microspheres larger than this range may impart an undesirably rough texture to the appliqué or may undesirably reduce its flexibility. The microspheres typically have a refractive index of about 1.7 to about 2.0, the range typically considered to be useful in exposed lens retroreflective products.

The retroreflective articles of this disclosure also include a transparent polyurethane polymeric layer. This polymer layer covers the regions between the transparent microspheres and the reflector layer and also typically covers the regions that are between the transparent microspheres. In this way the transparent polyurethane polymeric layer forms a protective layer between the transparent microspheres and the reflective layer or layers.

The transparent polyurethane polymeric layer is formed by drying of an aqueous polyurethane dispersion. A wide variety of aqueous polyurethane dispersions are suitable for forming the transparent polyurethane polymeric layer. Polyurethane dispersions are polyurethane polymers dispersed in a liquid media where the liquid media comprises water and may also include a variety of water miscible liquids. The polyurethane polymers are prepared from the reaction of polyisocyanates and polyols. In some instances, other polyisocyanate reactive components may be included, such as polyamines.

A wide variety of polyisocyanates and polyols are suitable for preparing the polyurethane dispersions. Examples of suitable polyisocyanates include any suitable organic polyisocyanate, aliphatic, cycloaliphatic, araliphatic or aromatic, can be used alone, or in combinations. While aromatic or aliphatic isocyanates are suitable, the aliphatic isocyanates generally give softer polymers and coatings that have better light stability than the aromatic isocyanates. Diisocyanates are one particularly desirable class of polyisocyanate. Low levels of isocyanates containing more than two isocyanate groups in the molecule can be included without measurable changes in the characteristics of the resulting polymer. Suitable organic polyisocyanates include dicyclohexylmethane 4,4'-diisocyanate (commonly referred to as $H_{12}MDI$), 1,3-bis(isocyanatomethyl)cyclohexane, 1,3-bis(1-isocyanato-1-methylethyl)benzene (commonly referred to as TMXDI), 3,5,5-trimethyl-1-isocyanato-3-isocyanatomethylcyclohexane (commonly referred to as isophorone diisocyanate or IPDI), m-phenylene diisocyanate, p-phenylene diisocyanate, 2,4-tolylene diisocyanate, 2,6-tolylene diisocyanate, 4,4'-diisocyanato diphenylmethane (commonly referred to as MDI), benzidine diisocyanate, naphthalene-1, 5-diisocyanate, hexamethylene diisocyanate (commonly referred to as HDI) and other alkylene diisocyanates (e.g., tetramethylene diisocyanate, decamethylene diisocyanate, and dodecamethylene diisocyanate), 4,4',4''-triphenylmethane triisocyanate, polyphenylmethylene polyisocyanates that are produced by phosgenation of aniline/formaldehyde condensation products containing up to about four aromatic rings, dianisidine diisocyanate, xylene diisocyanate, bis(2-isocyanatoethyl)fumarate, bis(2-isocyanatoethyl) cyclohex-4-ene-1,2-dicarboxylate, bis(2-isocyanatoethyl) carbonate, and many other organic polyisocyanates known in the art.

A wide variety of polyols or polyhydroxy compounds are suitable for reaction with the above described polyisocyanates to form the polyurethane polymers. Illustrative polyhydroxy compounds include the following classes of compounds: (a) lactone polyols and alkylene oxide adducts thereof, (b) polyester polyols, and alkylene oxide adducts thereof, (c) polyoxyalkylene polyols, polyoxycycloalkylene polyols, and alkylene oxide adducts thereof, (d) polytetramethylene glycols, and (e) polycarbonate polyols and alkylene oxide adducts thereof.

Diols are one particularly desirable class of polyols. The term "diol" is intended to include mixtures of diols as well as mixtures containing low levels of triols or tetrols that do not excessively affect the properties of the final product. Particularly suitable diols are the polyester diols, polycarbonate diols, and polyoxyalkylene diols.

The term "alkylene oxide" includes, e.g., ethylene oxide, 1,2-epoxypropane, 1,2-epoxybutane, 2,3-epoxybutane, isobutylene oxide, epichlorohydrin, and the like and mixtures thereof.

Lactone polyols are prepared by reacting a lactone such as epsilon-caprolactone or a mixture of epsilon-caprolactone and an alkylene oxide with a polyfunctional initiator such as polyhydric alcohol. The term "lactone polyols" also includes the various copolymers such as lactone copolyesters, lactone polyester/polycarbonates, lactone polyester/polyethers, lactone polyester/polyether/polycarbonates, and the like.

Polyester polyols are esterification products that range from liquids to non-crosslinked solids, i.e., solids that are soluble in many of the more common inert normally liquid organic media. Polyester polyols are prepared by the reaction of polycarboxylic acids, their anhydrides, their esters or their halides, with a stoichiometric excess of a polyol. Illustrative of the polycarboxylic acids that can be used to prepare the polyester polyols generally include dicarboxylic acids and tricarboxylic acids, such as maleic acid, succinic acid, glutaric acid, adipic acid, pimelic acid, suberic acid, azelaic acid, sebacic acid, chlorendic acid, 1,2,4-butanetricarboxylic acid, phthalic acid, and the like. The esterification reaction is well known in the art.

Polyoxyalkylene polyols include alkylene oxide adducts of, e.g., water, ethylene glycol, diethylene glycol, propylene glycol, dipropylene glycol, glycerol, 1,2,6-hexanetriol, 1,1,1-trimethylol ethane or propane, pentaerythritol, and the like. The alkylene oxides used in producing polyoxyalkylene polyols normally have from 2 to 4 carbon atoms. Ethylene oxide, propylene oxide, and mixtures thereof are particularly suitable.

Another useful class of polyols is the polyoxytetramethylene glycols, which are prepared by polymerizing tetrahydrofuran in the presence of acidic catalyst. As indicated above, triols, tetrols, triisocyanates, etc., can be used in making the polyurethane dispersions.

The molecular weight of the polyol component is one significant factor in determining the final properties of the polymer. Generally, the higher the molecular weight, the softer the resulting polymer. The term "molecular weight" is used herein to refer to the number average molecular weight ($M_n$). Polyols of molecular weight as low as 200 and as high as 5000 produce suitable polyurethane-urea polymer, molecular weight ranges of 300 to 3000 being particularly suitable and most readily commercially available. Polyols of lower molecular weight can be used for chain extension as discussed below.

Other useful coreactants for preparing polyurethane polymers useful in polyurethane dispersions include chain extenders and hydrophilic components. Chain extenders are compounds having 2 to 4 isocyanate-reactive groups, and generally are of relatively low molecular weight. Polyamines such as 1,6-diaminohexane are often used as chain extenders in polyurethane dispersions. Hydrophilic components are coreactive compounds containing at least one isocyanate-reactive group and at least one water solubilizing group, typically an ionic group. These hydrophilic components react into the polyurethane matrix and provide increased water solubility.

A wide variety of polyurethane dispersions or PUDs as they are sometimes called, can be prepared, or are commercially available. Suitable PUDs are ones which are transparent upon drying and are environmentally stable, meaning that they are stable upon exposure to oxygen, moisture and other components present in the environment. In particular, it is desirable that the polyurethane polymeric layer formed from the PUD be stable to laundering conditions so as to improve the wash durability of the retroreflective articles containing them. Examples of suitable commercially available PUDs include the dispersions available from Incorez Corp. Lancashire, England such as INCOREZ W835/092. In some embodiments, it may be desirable to add a silane compound to the PUD. Examples of suitable silanes include the bi-functional silane compounds described below.

One particularly suitable class of PUDs is those that contain functionalized polyurethanes, especially silane-terminated polyurethanes. Typically the silane-terminating groups contain hydrolysable silane groups such as hydroxyl or alkoxy groups.

The preparation of silane-terminated PUDs are described, for example, in PCT Publication WO 94/13723 (Onwumere et al.), U.S. Pat. No. 5,554,686 (Frisch, Jr. et al.), U.S. Pat. No. 6,046,295 (Frisch, Jr. et al.), U.S. Pat. No. 4,567,228 (Gaa et al.), and U.S. Pat. No. 7,70,082 (Mallo et al.). In some embodiments it is desirable to prepare the silane terminated PUD by reaction of a bi-functional silane compound with a polyurethane prepolymer and then dispersing into an aqueous media to form a PUD. The bi-functional silane compounds have a silane group at one terminus and a group that is reactive with the polyurethane prepolymer at the other terminus. Examples of suitable reactive functional groups include thiol groups, amino groups, hydroxyl groups, and isocyanate groups. Examples of bi-functional silane compounds include the amino-functional silane DYNASYLAN 1122 available from Evonik Industries, Overland Park, Kans. and the thiol-functional silane SILQUEST A 189 available from Momentive Performance Materials, Strongsville, Ohio.

The transparent polyurethane polymeric layer may be a single layer or comprise a plurality of sublayers. Additionally, this transparent polymeric layer may contain one or more additives. Among suitable additives are, silane-functional compounds, dyes, pigments, UV stabilizers, antioxidants, UV absorbers, property modifiers, performance enhancers, or combinations thereof. Such additives can provide UV stability to enhance the color fastness of the colored article, as well as improving the wash durability and flame retardency.

In some embodiments, the transparent polymeric layer contains a combination of a PUD and at least one silane-functional compound. By "silane-functional compound" it is meant a compound that has at least one terminal silane group, where the terminal silane group contains at least one hydrolysable group, that is to say a hydroxyl group or a group that forms a hydroxyl group upon reaction with water. Suitable silane-functional compounds are the bi-functional silane compounds described above. If the PUD is a silane-terminated PUD, typically a silane-functional compound is not added.

In some embodiments, the transparent polymeric layer is a colored layer and contains dyes, pigments, or a combination thereof. Making this additional layer a colored layer can make the article more highly colored and thereby make it more visible in daylight. Suitable dyes and pigments include those described above. The amount of colored additives, if used, is at a sufficiently low level so as to not interfere with the retroreflectivity of the reflective layer.

In some embodiments, the transparent polyurethane polymeric layer comprises a series of sublayers, with the sublayer being exposed to the external environment being a transparent polyurethane polymeric layer and other sublayers comprising polymeric polyurethane layers and may contain one or more additives such as the additives described above. In some embodiments, it may be desirable that one or more of the sublayers be a colored layer. When one or more of the sublayers is a colored layer, it typically is colored through the use of nanopigment particles. These nanopigment particles described in detail below. Typically the colored layer contains 0.1 to 70 percent nanopigment by weight of solids in the colored layer; from 1 to 40 percent nanopigment, by weight of solids in the colored layer; or from 5 to 35 percent nanopigment, by weight of solids in the colored layer.

Typically the transparent polyurethane polymeric layer is a relatively thin layer. The transparent polyurethane polymeric layer is generally between 0.01 and 100 micrometers in thickness.

As described above, the reflective layer may be a reflective metal layer, a dielectric reflective layer, or a combination thereof.

The reflective metal layer is a specularly reflective metal that forms a reflective metal layer coating. This technique facilitates the arrangement of the retroreflective elements (optical elements and reflective material) in substantially uniform direction for retroreflection. The size of the retroreflective elements, i.e. the surface portion of the microspheres covered with the reflective material, may be controlled in part by controlling the depth to which the microspheres are embedded in the polymer prior to applying the reflective material.

The reflective material can be a layer comprising an elemental metal that is capable of specularly reflecting light. A variety of metals may be used to provide a specular reflective metal layer. These include aluminum, silver, chromium, gold, nickel, magnesium, and the like, in elemental form, and combinations thereof. Aluminum and silver are particularly suitable metals for use in a reflective layer from a performance standpoint. The metal may be a continuous coating such as is produced by vacuum-deposition, vapor coating, chemical-deposition, or electroless plating. It is to be understood that in the case of aluminum, some of the metal may be in the form of the metal oxide and/or hydroxide. Aluminum and silver metals are desirable because they tend to provide the highest retroreflective brightness. The metal layer should be thick enough to reflect incoming light. Typically, the reflective metal layer is about 50 to 150 nanometers thick.

The dielectric reflective layer is a dielectric mirror. The dielectric mirror may be similar to known dielectric mirrors disclosed in U.S. Pat. Nos. 3,700,305 and 4,763,985 to Bingham. The dielectric mirrors typically are multi-layer constructions, with a layer having a refractive index $n_2$ and a layer of transparent material disposed thereon which has a refractive index $n_1$, and the opposite face of the transparent material (having a refractive index $n_1$) is in contact with a material having a refractive index $n_3$, where both $n_2$ and $n_3$ have a refractive index of at least 0.1, more typically at least 0.3, higher or lower than $n_1$. The transparent material is a layer that typically has an optical thickness corresponding to odd numbered multiples (that is, 1, 3, 5, 7 . . . ) of about one-quarter wavelength of light in the wavelength range of about 380 to about 1,000 nanometers. Thus, either $n_2 > n_1 < n_3$ or $n_2 < n_1 > n_3$, and the materials on either side of the transparent layer may be either both higher or both lower in refractive index than $n_1$. When $n_1$ is higher than both $n_2$ and $n_3$, $n_1$ is in the 1.7 to 4.9 range, and $n_2$ and $n_3$ are in the 1.2 to 1.7 range. Conversely, when $n_1$ is lower than both $n_2$ and $n_3$, $n_1$ is in the 1.2 to 1.7 range, and $n_2$ and $n_3$ are in the 1.7 to 4.9 range. The dielectric mirror generally comprises a contiguous array of materials, at least one being in layer form, having an alternating sequence of refractive indices. Typically, the contiguous array has from two to seven layers, more typically three to five layers, adjacent to the lens element. A dielectric mirror can provide very good retroreflectivity, although, it typically is not as efficient a reflector as a reflective metal layer.

Among the many compounds that may be used in providing transparent materials within the desired refractive index range are: high index materials such as CdS, $CeO_2$, CsI, GaAs, Ge, InAs, InP, InSb, $ZrO_2$, $Bi_2O_3$, ZnSe, ZnS, $WO_3$, PbS, PbSe, PbTe, RbI, Si, $Ta_2O_5$, $ZrO_2$, Te, $TiO_2$; low index materials such as cryolite, $Al_2O_3$, $AlF_3$, $CaF_2$, $CeF_3$, LiF, $MgF_2$, $Na_3AlF_6$, $ThOF_2$, elastomeric copolymers of perfluoropropylene and vinylidene fluoride (refractive index of >>1.38), etc. Other materials are reported in Thin Film Phenomena, K. L. Chopra, page 750, McGraw-Hill Book Company, N.Y., (1969). Particularly suitable dielectric mirrors contain layers of $SiO_2$, $CaF_2$, $MgF_2$, ZnS, $Nb_2O_5$, $Ta_2O_5$, $ZrO_2$, or combinations thereof. In some embodiments, the dielectric reflective layer comprises a layer of $CaF_2$, ZnS, or a combination thereof.

When the reflective layer is a dielectric reflective layer, additional benefits of the transparent polyurethane polymeric layer have been observed. In some embodiments, the retroreflectivity observed from the dielectric reflective layer is higher with the presence of the transparent polyurethane polymeric layer than in a similar article that does not contain the transparent polyurethane polymeric layer. Thus, a more highly retroreflective article can be produced.

Additionally, it has been observed that the dichroic effect for the dielectric reflective layer is reduced when the transparent polyurethane polymeric layer is present when compared to a similar article in which the transparent polyurethane polymeric layer is absent. Dichroism refers to the ability of a material to split visible light into distinct beams of different wavelength and thus different colors. The result of this dichroic effect with dielectric reflecting layers is that the dielectric reflecting material appears to be different colors when viewed from different angles. This is an undesirable effect in retroreflective articles, and it has been observed that the presence of the transparent polyurethane polymeric layer reduces this effect.

Because the protective transparent polyurethane polymeric layer is a layer with relatively low refractive index compared to the high refractive index material layers of the dielectric reflective layer, the protective transparent polyurethane polymeric layer can function not only as a protective layer, but also as part of the dielectric mirror as a low refractive index layer component of the multi-layer dielectric reflecting mirror. In this way the protective transparent polyurethane polymeric layer not only does not diminish the retroreflectivity of the formed article, it can enhance the retroreflectivity. Adding additional layers between the reflective layer and the transparent microspheres can diminish the retroreflectivity of the formed article (since light rays need to travel through an additional layer and can become attenuated or refracted), thus the use of additional layers between the reflective layer and the transparent microspheres can be problematic in retroreflective articles. In articles of the present disclosure where the mirror is a multi-layer dielectric reflecting layer, this concern is eliminated by making the protective transparent polyurethane polymeric layer an integral part of the multi-layer dielectric reflecting layer.

The bead bond layer may be a transparent bead bond layer or it may be a colored bead bond layer. A transparent bead bond layer typically contains a flexible polymeric binder material. A colored bead bond layer typically contains a flexible polymeric binder material and a colorant, generally the colorant is a pigment, a dye, or combination thereof. Typically pigments are used as pigments are more colorfast than dyes, as will be explained below. The bead bond layer, whether transparent or colored, also may contain such optional additives such as UV stabilizers, antioxidants, UV absorbers, property modifiers, performance enhancers, or combinations thereof. Generally, the bead bond layer contains from about 70 weight percent up to about 99 weight percent of a polymeric binder material with the remainder being colorant or other optional additives in effective amounts.

The polymeric binder material of the bead bond layer may be a polymer including, but not limited to, an elastomer. In this disclosure, an elastomer is defined as a polymer having an ability to be stretched to at least twice its original length and to retract to approximately its original length when released, (definition taken from "Hawley's Condensed Chemical Dictionary", R. J. Lewis Sr. Ed., 12th Ed., Van Nostrand Reinhold Co., New York, N.Y. (1993)). Typically, the polymeric binder material includes a cross-linked or virtually cross-linked elastomer. A cross-linked elastomer means that the polymeric chains of the elastomer are chemically cross-linked to form a three dimensional network which is stabilized against molecular flow. A virtually cross-linked elastomer means that the polymeric chain mobility of the elastomer is greatly reduced by chain entanglement and/or by hydrogen bonding, resulting in an increase in the cohesive or internal strength of the polymer. Examples of such polymer cross-linking include carbon-carbon bond formation such as: free radical bonding between vinyl groups between chains; agent or group coupling such as by vulcanization or reaction with a coupling agent such as a diol in the case of isocyanate or epoxy functionalized polymers; a diisocyanate or an activated ester in the case of amine and alcohol functionalized polymers; and epoxides and diols in the case of carboxylic acid or anhydride functionalized polymers. Examples of such virtual cross-linking include amide hydrogen bonding as is found in polyamides or crystalline and amorphous region interactions as is found in block copolymers of styrene and acrylonitrile.

Illustrative examples of the polymers that may be employed as the binder material in the bead bond layer include: polyolefins; polyesters; polyurethanes; polyepoxides; natural and synthetic rubbers; and combinations thereof. Examples of cross-linked polymers include the foregoing examples of polymers substituted with cross-linkable groups such as epoxide groups, olefinic groups, isocyanate groups, alcohol groups, amine groups or anhydride groups. Multifunctional monomers and oligomers which react with functional groups of the polymers may also be used as cross-linkers.

Specific examples of useful bead bond layer materials are disclosed in U.S. Pat. Nos. 5,200,262 and 5,283,101. In the '262 patent, the bead bond layer comprises one or more flexible polymers having active hydrogen functionalities such as crosslinked urethane-based polymers (for example, isocyanate cured polyesters or one of two component polyurethanes) and one or more isocyanate-functional silane coupling agents. In the '101 patent, the bead bond layer comprises an electron-beam cured polymer selected from the group consisting of chlorosulfonated polyethylenes, ethylene copolymers comprising at least about 70 weight percent polyethylene, and poly(ethylene-co-propylene-co diene) polymers.

Examples of commercially-available polymers that may be used in the colored bead bond layer include the following: VITEL 3550 B and VITEL 5833 polyesters available from Bostik Company, Wauwatosa, Wis.; RHOPLEX HA-8 and NW-1845 acrylic resins available from Dow Chemical; CYDROTHANE a polyurethane available from Cytec Industries, West Patterson, N.J.; ESTANE 5703 and 5715 available from Lubrizol Corp., Cleveland, Ohio; and NIPOL 1000, available from Zeon Chemicals, Inc., Louisville, Ky.

The bead bond layer typically has a thickness of about 50 to 250 micrometers (2 to 10 mils), with thicknesses of about 75 to 200 micrometers (3 to 8 mils) often being particularly suitable. It is to be understood that a bead bond layer having a thickness outside these ranges may be used; however, if the bead bond layer is too thin, it may not provide sufficient support to the microspheres, allowing them to become dislodged.

The bead bond layer, when colored, is colored by incorporating a dye, a pigment or a combination of dye and pigment therein. Examples of suitable dyes and pigments include those included in the following table:

| Color Index Name | Color Index Number | Company Order Number | Company |
| --- | --- | --- | --- |
| Yellow 16 | 12,700 | SUDAN YELLOW 146 | BASF, Florham Park, NJ |
| Yellow 56 | 11,021 | SUDAN YELLOW 150 | BASF, Florham Park, NJ |
| Red 1 | 12,150 | SUDAN RED 290 | BASF, Florham Park, NJ |
| Blue 35 | 61,554 | SUDAN BLUE 35 | BASF, Florham Park, NJ |
| Pigment Yellow 83 | 21,108 | 275-0570 | Sun Chemical, Parsippany, NJ |
| Pigment Yellow 17 | 21,105 | 275-0023 | Sun Chemical, Parsippany, NJ |

In some embodiments, the colorant is a highly visible fluorescent dye and/or pigment. Fluorescent dyes and/or pigments can provide enhanced conspicuity under daytime lighting conditions. Examples of fluorescent dyes or pigments that may be used to color the bead bond layer, include: DAY-GLO FIRE ORANGE T-14, ROCKET RED GT, BLAZE ORANGE GT, and SATURN YELLOW T-17, from Day-Glo Color Corp., Cleveland, Ohio; FLARE 911 from Cleveland Pigment & Color Co., Akron, Ohio; LUMOGEN F RED 300, F YELLOW 083, and YELLOW 50790 (PIGMENT YELLOW 101, C.I. No. 48052), BASF Corporation, Parsippany, N.J.

A pigment can be any material that is capable of changing the color of reflected or transmitted light as the result of wavelength-selective adsorption. Any colored pigment can be utilized in retroreflective articles as disclosed herein. In embodiments, the pigment can be a nanopigment. A nanopigment is a pigment that generally has an average particle size in the nanometer range. In embodiments, a nanopigment can have an average particle size from about 1 nm to about 1000 nm. Nanopigments can be useful because of the interaction of light with them; light will diffract from nanopigments because of their size, which can contribute to high reflectivities. In embodiments, a nanopigment can have an average particle size from about 50 nm to about 500 nm. An exemplary nanopigment that can be utilized includes CABOJET 300, which is commercially available from Cabot Corporation (Boston, Mass.).

In some embodiments, the colored bead bond layer can include both nanopigments and other sized pigments (which can be referred to herein as "normal pigments"). Normal pigments can generally have average particle sizes from about 1 micrometer to about 40 micrometers. In embodiments, normal pigments can have average particle sizes from about 1 micrometer (1000 nm) to about 10 micrometers. In embodiments that include both nanopigments and normal pigments, the nanopigments can account for at least about 5 percent of the total pigment by weight. In embodiments that include both nanopigments and normal pigments, the nanopigments can account for at least about 10 percent of the total pigment by weight. In some embodiments, the colored bead bond layer includes both pigments and dyes, such as both nanopigments and dyes for example.

The colored bead bond layer generally includes a desirable amount of pigment to provide a desired color or depth of color of the colored bead bond layer or article. The amount of pigment in the colored bead bond layer can depend at least in part on the particular pigment(s) utilized, the desired color or shade of color, the other components in the colored bead bond layer, and combinations thereof. In embodiments, the colored bead bond layer can have 0.1 to 70 percent pigment, by weight of solids in the colored bead bond layer; from 1 to 40 percent pigment, by weight of solids in the colored bead bond layer; or from 5 to 35 percent pigment, by weight of solids in the colored bead bond layer.

The above methods can be used to prepare a wide variety of retroreflective articles. Disclosed herein are retroreflective articles that comprise a layer of optical elements. The optical elements are transparent microspheres, a transparent polyurethane polymeric layer, and at least one reflective layer. The optical elements are embedded in a bead bond layer, where the bead bond layer may include a colorant. The reflective layer may be a reflective metal layer, a dielectric reflective layer, or a combination thereof.

Besides the properties of retroreflectivity and high daylight visibility, the retroreflective articles of this disclosure have a variety of other desirable properties. Among these properties are wash durability, flame retardency, and color fastness.

By wash durability it is meant that the retroreflective articles of this disclosure are capable of being laundered without losing the desired properties of the article, namely retroreflectivity and high daylight visibility. Wash durability of retroreflective articles can be described in a variety of different ways. An example of good washing performance was described in US Patent Publication No. 2011/0292508 (Huang et al.), as retaining at least about 100 candelas/lux/meter$^2$ at 5/0.2 angle after being washed 15 times. In some embodiments, the retroreflective article can retain at least about 200 candelas/lux/meter$^2$ at 5/0.2 angle after being washed 15 times. In yet other embodiments, the retroreflective article can retain at least about 300 candelas/lux/meter$^2$ at 5/0.2 angle after being washed 15 times.

By flame retardant it is meant that the retroreflective articles of this disclosure are resistant to heat and flames. The articles of this disclosure can be exposed to heat or flames without losing the desired properties of the article, namely retroreflectivity and high daylight visibility. This is particularly desirable in applications where heat and flames are likely to be encountered by the articles, such as on articles of clothing to be worn by firefighters.

By color fastness, it is meant that the color of a colored layer in the retroreflective article does not fade with time or upon exposure to the environment or upon being washed. The colored layer may be a colored sublayer in the transparent polyurethane polymeric layer or it may be the bead bond layer.

In some embodiments, it is desirable that the surface of the retroreflective articles be discontinuous. By discontinuous it is meant that there is a region on the surface that is devoid of microspheres and bead bond layer, with the discontinuities surrounded by regions of continuity. These discontinuities can be beneficial for a variety of reasons. In some embodiments, the discontinuities can form a pattern or design. The pattern or design can be in the form of indicia, logos, etc. In other embodiments, the discontinuities can be arranged either randomly or in a non-continuous pattern. Besides the visual effect of the discontinuities, the discontinuities can provide enhanced breathability for the retroreflective article. By this it is meant that gases, and or moisture can pass through the retroreflective article more easily. An effect of the enhanced breathability is to be more comfortable for a person wearing such an article. This is particularly desirable for construction workers, firefighters, emergency workers, and people exercising. Examples of various designs of retroreflective articles having discontinuous segments can be seen FIGS. 2-5 of U.S. Pat. No. 8,256,025.

Retroreflective articles with discontinuous surfaces can be prepared a variety of different ways. A particularly suitable way involves partially removing optical elements and bead bond layer from portions of the surface. This removal can be effected by cutting, scraping, hole-punching, and other suitable mechanical means.

Examples of articles of this disclosure are provided in the Figures. FIG. 1 is a cross sectional depiction of an embodiment of this disclosure. In FIG. 1, the article includes transparent microspheres 110, transparent polyurethane polymeric layer 120, reflective layer 130 and bead bond layer 140. In this embodiment, the reflective layer 130 is a reflective metal layer. Also, transparent polyurethane polymeric layer 120 is shown as a single layer.

Figure 2:
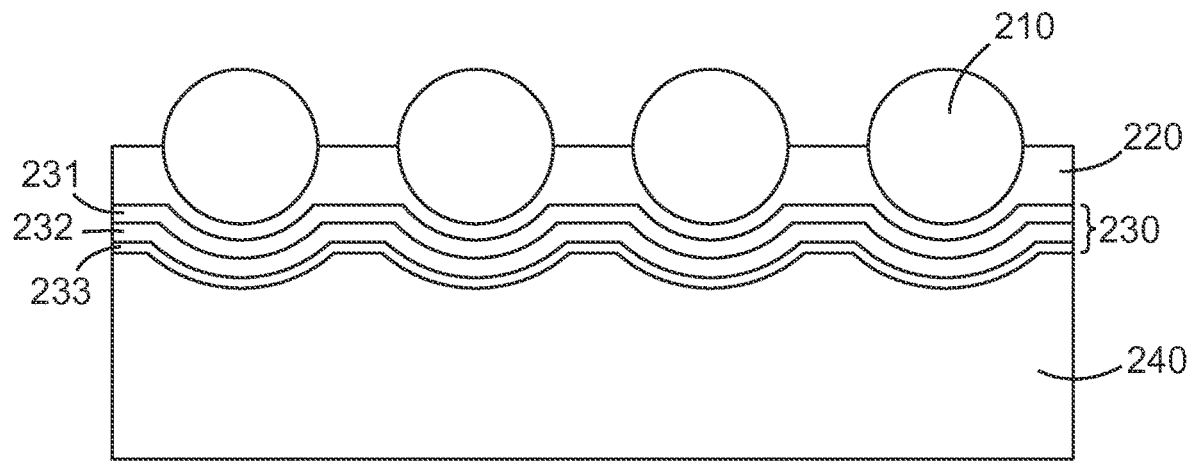
FIG. 2 shows a cross-sectional view of an embodiment of an article of this disclosure.

FIG. 2 depicts an alternative embodiment of this disclosure. In FIG. 2, the article includes transparent microspheres 210, transparent polyurethane polymeric layer 220, reflective layer 230 and bead bond layer 240. In this embodiment, the reflective layer 230 is a dielectric reflective layer comprising sublayers 231, 232, and 233. Also, transparent polyurethane polymeric layer 220 is shown as a single layer.

Figure 3:
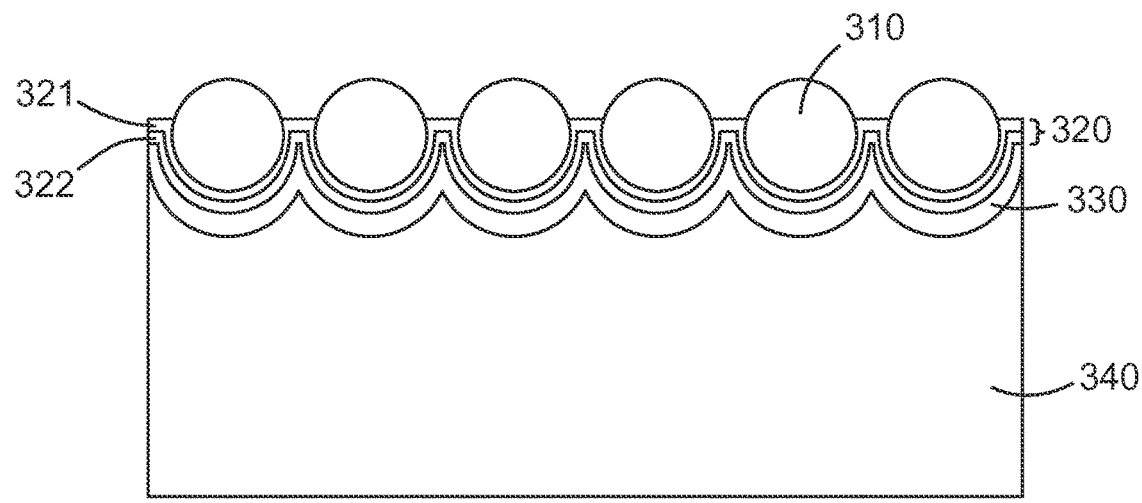
FIG. 3 shows a cross-sectional view of an embodiment of an article of this disclosure.

FIG. 3 depicts an alternative embodiment of this disclosure. In FIG. 3, the article includes transparent microspheres 310, transparent polyurethane polymeric layer 320, reflective layer 330 and bead bond layer 340. In this embodiment, the reflective layer 330 is a reflective metal layer. Also, transparent polyurethane polymeric layer 320 is shown as a multilayer construction comprising sublayers 321 and 322. Sublayer 321 is a transparent layer and sublayer 322 may be transparent or a colored layer.

Figure 4:
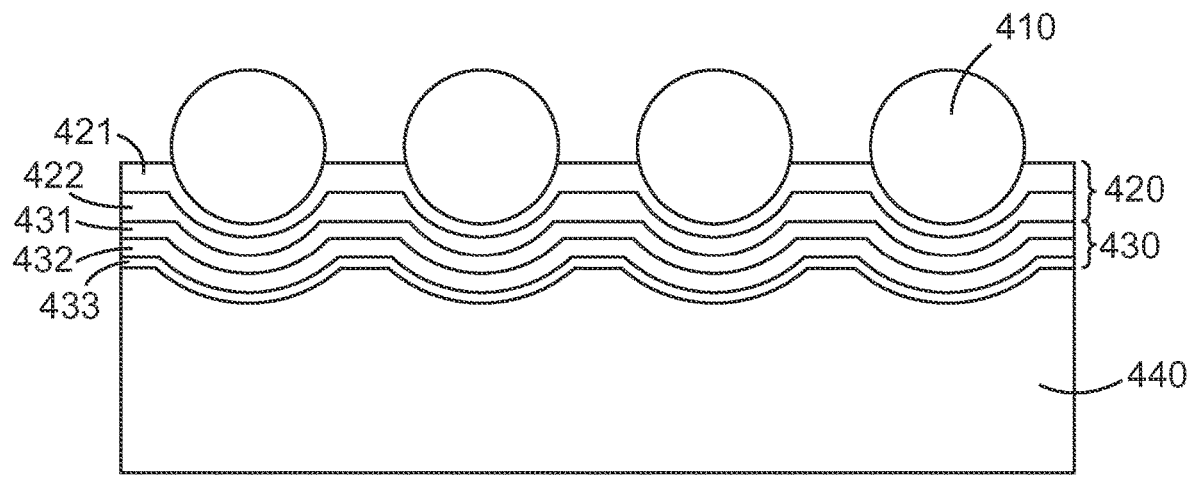
FIG. 4 shows a cross-sectional view of an embodiment of an article of this disclosure.

FIG. 4 depicts an alternative embodiment of this disclosure. In FIG. 4, the article includes transparent microspheres 410, transparent polyurethane polymeric layer 420, reflective layer 430 and bead bond layer 440. In this embodiment, the reflective layer 430 is a dielectric reflective layer comprising sublayers 431, 432, and 433. Also, transparent polyurethane polymeric layer 420 is shown as a multilayer construction comprising sublayers 421 and 422. Sublayer 421 is a transparent layer and sublayer 422 may be transparent or a colored layer.

Also disclosed herein are a variety of intermediate articles. By intermediate articles it is meant articles in which the polymeric carrier layer is attached to the article. The intermediate articles are not themselves retroreflective articles, but become retroreflective articles upon the removal of the polymeric carrier layer.

The intermediate articles comprise a polymeric carrier layer with a first major surface and a second major surface, a layer of optical elements, partially embedded in the first major surface of the polymeric carrier layer, the optical elements comprising transparent microspheres, a transparent polymeric polyurethane layer, and at least one reflective layer, and a bead bond layer disposed on the reflective layer, wherein the transparent polymeric polyurethane layer comprises a dried layer prepared from an aqueous polyurethane dispersion.

The intermediate article can be immediately subjected to addition steps to generate the final retroreflective article, or the intermediate article can be stored for later use, shipped to another location, or subjected to additional processing steps such as cutting, attachment to a substrate, and the like. It is desired to form this intermediate article, because this intermediate article can be stored, shipped, or processed without exposing the optical elements. Once the optical elements are exposed, even though they contain a protective transparent polyurethane polymeric layer, they are subject to potential damage from abrasion, staining and the like. When desired, the polymeric carrier layer is removed to form the final retroreflective article.

Figure 5:
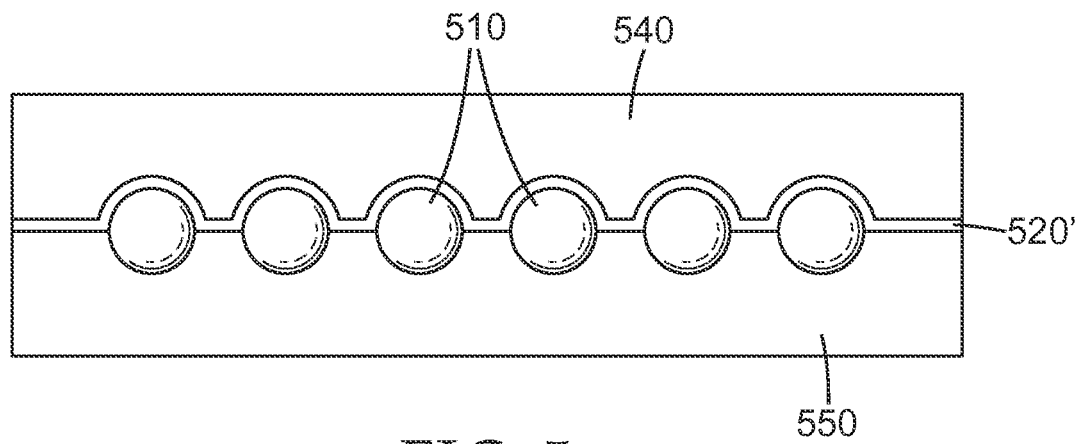
FIG. 5 shows a cross-sectional view of an embodiment of an intermediate article of this disclosure.

FIG. 5 depicts an intermediate article of this disclosure. In FIG. 5, the intermediate article includes transparent microspheres 510, layer 520', bead bond layer 540, and polymeric carrier layer 550. For simplicity, layer 520' is used to designate the transparent polyurethane polymeric layer or layers as well as the reflective layer (either a reflective metal layer or a multi-layer dielectric reflecting layer).

Figure 6:
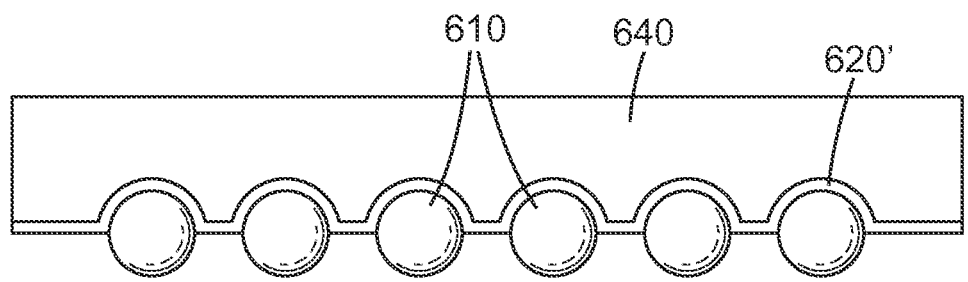
FIG. 6 shows a cross-sectional view of an embodiment of an article of this disclosure.

FIG. 6 depicts the final retroreflective article formed when the polymeric carrier layer is removed from the article of FIG. 5. In FIG. 6, the article includes transparent microspheres 610, layer 620', and bead bond layer 640. The polymeric carrier layer 550 of the article of FIG. 5 has been removed. Once again, for simplicity, layer 620' is used to designate the transparent polyurethane polymeric layer or layers as well as the reflective layer (either a reflective metal layer or a multi-layer dielectric reflecting layer).

Also disclosed herein are articles of clothing that contain retroreflective appliqués. These articles of clothing comprise a fabric with a first major surface and a second major surface, and a retroreflective appliqué attached to the first major surface of the fabric. The retroreflective appliqué is the retroreflective article described above. A wide variety of fabrics are suitable.

The retroreflective appliqué can be attached to the fabric surface by a wide range of attachment techniques such as mechanical attachment or adhesive attachment. Examples of mechanical attachment techniques include, for example, sewing and heat lamination. In adhesive attachment, an adhesive can be applied to the bead bond layer or a backing layer can be applied to the bead bond layer and an adhesive layer applied to the backing layer.

Examples of suitable adhesive layers include pressure sensitive adhesives, heat activated adhesives, and laminating adhesives. The adhesive layer may be applied to the bead bond layer or backing layer by coating or by lamination of a formed adhesive layer to the bead bond layer or backing layer.

A wide variety of pressure sensitive adhesives are suitable including tackified natural rubbers, synthetic rubbers, tackified styrene block copolymers, polyvinyl ethers, poly (meth) acrylates, polyurethanes, polyureas, poly-alpha-olefins, and silicones. The pressure sensitive adhesive may be covered with a release liner to protect the adhesive prior to adhesion to a substrate.

Heat activated adhesives are very similar to pressure sensitive adhesives but require the application of heat to become tacky. One advantage of heat activated adhesives is that, because they are not tacky at room temperature, they typically do not require a release liner to protect the adhesive layer prior to adhesion to a substrate.

Typically, if a laminating adhesive is used, the adhesive layer is immediately bonded to a substrate to form the adhesive substrate bond. Examples of laminating adhesives include hot melt adhesives, adhesive dispersions and suspensions, and curing adhesives such as cyanoacrylates.

A wide variety of articles of clothing are suitable for attachment of retroreflective appliqués. Examples of such articles of clothing include, for example, vests such as the safety vests frequently worn by road construction workers, but also include a wide range of other clothing types. Examples include, shirts, sweaters, jackets, coats, pants, shorts, socks, shoes, gloves, belts, hats, suits, one-piece body garments, and the like.

This disclosure includes the following embodiments:

Among the embodiments are retroreflective articles. A first embodiment includes a retroreflective article comprising: a layer of optical elements, the optical elements comprising: transparent microspheres, a transparent polymeric polyurethane layer, and at least one reflective layer; and a bead bond layer, wherein the transparent polymeric polyurethane layer comprises a dried layer prepared from an aqueous polyurethane dispersion.

Embodiment 2 is the retroreflective article of embodiment 1, wherein the aqueous polyurethane dispersion comprises a functionalized polyurethane.

Embodiment 3 is the retroreflective article of embodiment 2, wherein the functionalized polyurethane comprises a silane terminated polyurethane.

Embodiment 4 is the retroreflective article of any of embodiments 1-3, wherein the aqueous polyurethane dispersion further comprises dispersed pigment particles and the transparent polymeric polyurethane layer comprises a colored transparent polymeric polyurethane layer.

Embodiment 5 is the retroreflective article of embodiment 4, wherein the pigment particles comprise nanopigment particles.

Embodiment 6 is the retroreflective article of any of embodiments 1-5, wherein the aqueous polyurethane dispersion further comprises one or more additives, the additives comprising pigments, dyes, UV stabilizers, antioxidants, UV absorbers, property modifiers, performance enhancers, or combinations thereof.

Embodiment 7 is the retroreflective article of any of embodiments 1-6, wherein the transparent polymeric polyurethane layer has a thickness of from 0.1 to 100 micrometers.

Embodiment 8 is the retroreflective article of any of embodiments 1-7, wherein the reflective layer comprises a reflective metal layer comprising a layer of layer of aluminum, silver, or a combination thereof, or a dielectric reflective layer comprising a layer of $SiO_2$, cryolite, $TiO_2$, $CaF_2$, $MgF_2$, ZnS, $Nb_2O_5$, $Ta_2O_5$, $ZrO_2$, or a combination thereof.

Embodiment 9 is the retroreflective article of embodiment 8, wherein the reflective layer comprises a dielectric reflective layer and wherein the retroreflectivity of retroreflective article is greater than the retroreflectivity of an article with same dielectric reflective layer and no transparent polymeric polyurethane layer.

Embodiment 10 is the retroreflective article of embodiment 8, wherein the reflective layer comprises a dielectric reflective layer and wherein the dielectric reflective layer has a reduced dichroic effect than an article with same dielectric reflective layer and no transparent polymeric polyurethane layer.

Embodiment 11 is the retroreflective article of any of embodiments 1-10, wherein the article is wash durable.

Embodiment 12 is the retroreflective article of embodiment 4, wherein the colored transparent polymeric polyurethane layer is a colorfast layer.

Embodiment 13 is the retroreflective article of any of embodiments 1-12, further comprising one or more additional polymer layers between the transparent polymeric polyurethane layer and the reflective layer.

Embodiment 14 is the retroreflective article of embodiment 13, wherein at least one of the one or more additional polymer layers comprises a colored polymeric layer.

Embodiment 15 is the retroreflective article of any of embodiments 1-14, wherein the bead bond layer comprises a colored bead bond layer.

Embodiment 16 is the retroreflective article of embodiment 15, wherein the colored bead bond layer comprises at least one bead bond polymer and at least one pigment.

Also disclosed are articles of clothing. Embodiment 17 includes an article of clothing comprising: a fabric with a first major surface and a second major surface; and a retroreflective appliqué attached to the first major surface of the fabric, the retroreflective appliqué comprising: a layer of optical elements, the optical elements comprising: transparent microspheres, a transparent polymeric polyurethane layer, and at least one reflective layer; and a bead bond layer, wherein the transparent polymeric polyurethane layer dried layer prepared from an aqueous polyurethane dispersion.

Embodiment 18 is the article of clothing of embodiment 17, wherein the transparent polymeric polyurethane layer comprises a colored transparent polymeric polyurethane layer prepared from a mixture of an aqueous polyurethane dispersion and dispersed pigment particles.

Embodiment 19 is the article of clothing of any of embodiments 16-18, wherein the aqueous polyurethane dispersion comprises a functionalized polyurethane.

Embodiment 20 is the article of clothing of embodiment 19, wherein the functionalized polyurethane comprises a silane terminated polyurethane.

Embodiment 21 is the article of clothing of any of embodiments 16-20, wherein the article is wash durable.

Also disclosed are methods of preparing retroreflective articles. Embodiment 22 includes a method of preparing a retroreflective article comprising: providing a polymeric carrier layer with a first major surface and a second major surface; providing transparent microspheres; partially embedding the transparent microspheres into the first major surface of the polymeric carrier layer such that the beads at least partially protrude from the first major surface of the polymeric carrier layer to form a layer of microspheres; depositing a coating composition comprising a an aqueous polyurethane dispersion on the layer of microspheres; drying the coating composition to form a transparent polyurethane polymeric layer on the layer of transparent microspheres; depositing one or more reflective layers on at least a portion of the first major surface of the polymeric carrier layer and the layer of microspheres; applying a bead bond layer to the layer of microspheres; and removing the polymeric carrier layer.

Embodiment 23 is the method of embodiment 22, wherein the polymeric carrier layer comprises a thermoplastic polymeric carrier layer.

Embodiment 24 is the method of any of embodiments 22-23, wherein the aqueous polyurethane dispersion comprises a functionalized polyurethane.

Embodiment 25 is the method of embodiments 24, wherein the functionalized polyurethane comprises a silane terminated polyurethane.

Embodiment 26 is the method of any of embodiments 22-25, wherein the aqueous polyurethane dispersion further comprises dispersed pigment particles and the transparent polymeric polyurethane layer comprises a colored transparent polymeric polyurethane layer.

Embodiment 27 is the method of embodiment 26, wherein the pigment particles comprise nanopigment particles.

Embodiment 28 is the method of any of embodiments 22-27, wherein the transparent polymeric polyurethane layer has a thickness of from 0.1 to 100 micrometers.

Embodiment 29 is the method of any of embodiments 22-28, wherein the reflective layer comprises a reflective metal layer comprising a layer of layer of aluminum, silver, or a combination thereof, or a dielectric reflective layer comprising a layer of $SiO_2$, cryolite, $TiO_2$, $CaF_2$, $MgF_2$, ZnS, $Nb_2O_5$, $Ta_2O_5$, $ZrO_2$, or a combination thereof.

Also disclosed are intermediate articles. Embodiment 30 includes an article comprising: a polymeric carrier layer with a first major surface and a second major surface; layer of optical elements, partially embedded in the first major surface of the polymeric carrier layer, the optical elements comprising: transparent microspheres, a transparent polymeric polyurethane layer, and at least one reflective layer; and a bead bond layer disposed on the reflective layer, wherein the transparent polymeric polyurethane layer comprises a dried layer prepared from an aqueous polyurethane dispersion.

Embodiment 31 is the article of embodiment 30, wherein the aqueous polyurethane dispersion comprises a functionalized polyurethane.

Embodiment 32 is the article of embodiment 31, wherein the functionalized polyurethane comprises a silane terminated polyurethane.

Embodiment 33 is the article of any of embodiments 30-32, wherein the aqueous polyurethane dispersion further comprises dispersed pigment particles and the transparent polymeric polyurethane layer comprises a colored transparent polymeric polyurethane layer.

Embodiment 34 is the article of embodiment 33, wherein the pigment particles comprise nanopigment particles.

Embodiment 35 is the article of any of embodiments 30-34, wherein the aqueous polyurethane dispersion further comprises one or more additives, the additives comprising pigments, dyes, UV stabilizers, antioxidants, UV absorbers, property modifiers, performance enhancers, or combinations thereof.

Embodiment 36 is the article of any of embodiments 30-35, wherein the transparent polymeric polyurethane layer has a thickness of from 0.1 to 100 micrometers.

Embodiment 37 is the article of any of embodiments 30-36, wherein the reflective layer comprises a reflective metal layer comprising a layer of layer of aluminum, silver, or a combination thereof, or a dielectric reflective layer comprising a layer of $SiO_2$, cryolite, $TiO_2$, $CaF_2$, $MgF_2$, ZnS, $Nb_2O_5$, $Ta_2O_5$, $ZrO_2$, or a combination thereof.

Embodiment 38 is the article of embodiment 37, wherein the reflective layer comprises a dielectric reflective layer and wherein the dielectric reflective layer has a reduced dichroic effect than an article with same dielectric reflective layer and no transparent polymeric polyurethane layer.

Embodiment 39 is the article of any of embodiments 30-38, further comprising one or more additional polymer layers between the transparent polymeric polyurethane layer and the reflective layer.

Embodiment 40 is the article of embodiment 39, wherein at least one of the one or more additional polymer layers comprises a colored polymeric layer.

Embodiment 41 is the article of any of embodiments 30-40, wherein the bead bond layer comprises a colored bead bond layer.

Embodiment 42 is the article of embodiment 41, wherein the colored bead bond layer comprises at least one bead bond polymer and at least one pigment.

EXAMPLES

These examples are merely for illustrative purposes only and are not meant to be limiting on the scope of the appended claims. All parts, percentages, ratios, etc. in the examples and the rest of the specification are by weight, unless noted otherwise. Solvents and other reagents used were obtained from Sigma-Aldrich Chemical Company; Milwaukee, Wis. unless otherwise noted. The following abbreviations are used: nm=nanometers; mPa=milliPascals; psi=pounds per square inch; MPa=MegaPascals; min=minutes; mm=millimeters. The terms "weight %", "% by weight", and "wt %" are used interchangeably.

Table of Abbreviations

| Abbreviation or Trade Designation | Description |
| --- | --- |
| Colorant-1 | Cyan particulate pigment, commercially available as "CAB-O-JET 250 C" from Cabot Corporation, Boston, MA. |
| Colorant-2 | Magenta particulate pigment, commercially available as "Cab-O-Jet 260 M" from Cabot Corporation, Boston, MA. |
| PUD-1 | Polyurethane dispersion, commercially available as "INCOREZ W835/092" from Incorez Corp. Lancashire, England. |
| Silane-1 | Commercially available as "DYNASYLAN 1122" from Evonik Industries, Overland Park, KS. |
| Comp-1 | A retroreflective article commercially available as 3M SCOTCHLITE Reflective Material - 9587, commercially available from 3M Company, St. Paul, MN. |
| Colorant-3 | Commercially available as "GT-17-N SATURN YELLOW PIGMENT" from Day-Glo Color Corp., Cleveland, OH. |
| PUD-2 | Polyurethane dispersion, commercially available as "SANCURE 835" from Lubrizol Advanced Materials, Cleveland, OH. |
| Polyol-1 | Carbonate polyol, commercially available as "KURARAY C 2090" form Kuraray Co., Tokyo, Japan. |
| PI-1 | Polyisocyanate-1, an aliphatic polyisocyanate commercially available as "DESMODUR XP 2838" from Bayer, Pittsburgh, PA. |
| Silane-2 | Commercially available as "SILQUEST A 189" from Momentive Performance Materials, Strongsville, OH. |
| Cat-1 | Catalyst-1, polyurethane catalyst commercially available as "BICAT 8108" from Shepherd Chemical Company, Norwood, OH. |
| Colorant-4 | Fluorescent yellow pigment particle, commercially available as an aqueous dispersion as "SPL-17N" from DayGlo Color Corp., Cleveland, OH. |
| ST-PUD-1 | Silane terminated polyurethane dispersion, prepared as described in U.S. Pat. No. 5,554,686 (Frisch, Jr. et al.), using polyether diol. |
| ST-PUD-2 | Silane terminated polyurethane dispersion, prepared as described in U.S. Pat. No. 5,554,686 (Frisch, Jr. et al.), using polycarbonate diol. |
| PE-1 | A 50% solids polyester resin commercially available as "VITEL 3550 B" from Bostik Company, Wauwatosa, WI. |
| PE-2 | A polyester resin commercially available as "VITEL 5833" from Bostik Company, Wauwatosa, WI. |
| Silane-3 | Commercially available as "SILQUEST A 1310" from Momentive Performance Materials, Strongsville, OH. |
| PI-2 | Polyisocyanate-2, an aromatic polyisocyanate commercially available as "DESMODUR L 75" from Bayer, Pittsburgh, PA. |

Table of Abbreviations

| Abbreviation or Trade Designation | Description |
|---|---|
| Cat-2 | Dibutyl tin dilaurate, (DBTDL), polyurethane catalyst. |
| MIBK | Methyl isobutyl ketone solvent |
| EA | Ethyl acetate solvent |
| PI-3 | Polyisocyanate-3, an aliphatic polyisocyanate commercially available as "DESMODUR N3300" from Bayer, Pittsburgh, PA. |
| Adhesive-1 | Adhesive composition prepared in Synthesis Example S1 below. |
| MEK | Methy ethyl ketone solvent |
| DAA | Diacetone Alcohol solvent |
| FR-1 | Flame Retardant-1, brominated flame retardant, commercially available as "SAYTEX 102E", Albemarle Corp., Baton Rouge, LA. |
| TPU-1 | Thermoplastic Polyurethane, commercially available as "ESTANE 5703" from Lubrizol, Cleveland, OH. |
| Ox-1 | Antimony Oxide |
| Ox-2 | Titanium Oxide |
| PUR | Polyurethane resin, commercially available as "MONDUR CB-75" from Mobay Chemical Co., Pittsburgh, PA. |

Synthesis Example S1: Adhesive-1

Adhesive-1 was prepared by mixing together the components shown in Table S1.

TABLE S1

| Component | Amount (parts by weight) |
|---|---|
| MEK | 20.8 |
| DAA | 28.2 |
| FR-1 | 7.1 |
| TPU-1 | 14.3 |
| Ox-1 | 4.3 |
| Ox-2 | 23.3 |
| PUR | 2 |

Synthese Example S2: Preparation of Glass Bead Carrier Layer

A temporary glass bead carrier was prepared in a procedure as described in U.S. Pat. No. 5,474,827. A polyethylene layer was coated on a paper backing. The polyethylene layer was heated, and glass beads with diameter in the range of 40-90 micrometers were cascaded and sunk into the polyethylene. The sink depth was smaller than the glass beads diameter, and a portion of the microspheres remained exposed above the surface of the polyethylene.

Examples 1 and 2 and Comparative Example C1

Sample Fabrication:

Retroreflective articles (Examples 1 and 2) were prepared using the following multi-step procedure. For Comparative Example C1, a sample of Comp-1 was used.

Coating formulations were prepared by mixing together 5.0 grams of Colorant-1-(Example 1) or Colorant-2 (Example 2), 4.7 grams of PUD-1, 0.05 grams of Silane-1, and 14.0 grams of ethanol to form a 9.04% solids solution.

The coating formulations prepared above were coated on a sample of the glass bead carrier prepared in Synthesis Example S2 with a notch bar coater with the coating gap set at 51 micrometers (2 mils). The coating was dried at 65° C. (149° F.) for 3 min, followed by 90° C. (194° F.) for 2 min.

The coated glass bead layers were vapor coated with a thin layer of silver metal to from a silver metal mirror layer.

A colored bead bond composition was prepared as a 50% solids composition by mixing together the components shown in Table A.

TABLE A

| Component | Amount (parts by weight) |
|---|---|
| PE-1 | 60.6 |
| PE-2 | 10.88 |
| Silane-3 | 1.21 |
| Colorant-3 | 6.93 |
| PI-2 | 2.43 |
| Cat-2 | 0.121 |
| MEK | 10.88 |
| MIBK | 6.93 |

After vapor coating, the samples were coated with the Bead Bond composition described above, followed by a thermal treatment for 30 seconds at 71° C. (160° F.), and for 3 min at 82° C. (180° F.).

The exposed surface of the Bead Bond layer was laminated to an adhesive layer coated on an aramid fabric. The adhesive layer was Adhesive-1 and had a wet coating thickness of 0.23 mm (9 mils). The lamination was performed at approximately 104° C. (220° F.) and 70 psi (482 MPa) pressure.

Following the lamination process, the carrier layer was stripped away, exposing the previously embedded surfaces of the monolayer of glass microspheres to produce a colored retroreflective article.

Wash DurabilityTests:

The samples of Examples 1 and 2 and Comparative Example C1 were washed using the method ISO 6330 2A. The results are shown in Table 1. Examples 1 and 2 show higher retroreflectivity retention after washing due to more glass beads being retained in the article.

TABLE 1

| Number of Wash Cycles | Retroreflectivity ($R_a$) | | |
|---|---|---|---|
| | C1 | Example 1 | Example 2 |
| 0 | 540 | 626 | 626 |
| 5 | 419 | 585 | 619 |

TABLE 1-continued

| Number of Wash Cycles | Retroreflectivity ($R_a$) | | |
|---|---|---|---|
| | C1 | Example 1 | Example 2 |
| 10 | 389 | 543 | 567 |
| 15 | 330 | 481 | 517 |
| 20 | 295 | 433 | 465 |
| 25 | 265 | 394 | 416 |
| 30 | 240 | 366 | 405 |
| 35 | 210 | 321 | 361 |
| 40 | 207 | 292 | 315 |
| 45 | 182 | 264 | 280 |
| 50 | 162 | 232 | 239 |

Example 3 and Comparative Example C2

Sample Fabrication:

The retroreflective article for Example 3 was prepared using the following multi-step procedure. For Comparative Example C2, a sample of Comp-1 was used.

A protective coating layer was prepared by coating a Colored Coating Layer and Clear Coating Layer.

Color Coating Solution:

The Color Coating Solution was prepared by mixing together 3.9 grams of Colorant-3, 4.0 grams of PUD-2, and 3.4 grams of water to form a 23.9% solids solution.

Clear Coating Solution:

The Clear Coating Solution was prepared by mixing together 2.3 grams of Polyol-1, 1.09 grams of PI-1, 0.25 grams of Silane-1, 0.25 grams of Silane-2, 0.2 grams of Cat-1, and 8.9 grams of EA to form a 30% solids solution.

The Colored Coating Solution prepared above was coated on a sample of the glass bead layer prepared in Synthesis Example S2 using a notch bar coater with a coating gap set at 51 micrometers (2 mils). The coating was dried at 65° C. (149° F.) for 3 min, followed by 90° C. (194° F.) for 2 min. After this the Clear Coating Solution prepared above was coated on the dried Colored Coating Solution layer using a notch bar coater with a 38 micrometer (1.5 mil) gap. The coating was dried at 65° C. (149° F.) for 3 min, followed by 90° C. (194° F.) for 2 min.

The coated glass bead layer was vapor coated with a thin layer of silver metal to from a silver metal mirror layer.

A colored bead bond composition was prepared as a 50% solids composition by mixing together the components shown in Table A.

TABLE A

| Component | Amount (parts by weight) |
|---|---|
| PE-1 | 60.6 |
| PE-2 | 10.88 |
| Silane-3 | 1.21 |
| Colorant-3 | 6.93 |
| PI-2 | 2.43 |
| Cat-2 | 0.121 |
| MEK | 10.88 |
| MIBK | 6.93 |

After vapor coating, the sample was coated with the Bead Bond composition described above, followed by a thermal treatment for 30 seconds at 71° C. (160° F.), and for 3 min at 82° C. (180° F.).

The exposed surface of the Bead Bond layer was laminated to an adhesive layer coated on an aramid fabric. The adhesive layer was Adhesive-1 and had a wet coating thickness of 0.23 mm (9 mils). The lamination was performed at approximately 104° C. (220° F.) and 70 psi (482 MPa) pressure.

Following the lamination process, the carrier layer was stripped away, exposing the previously embedded surfaces of the monolayer of glass microspheres to produce a colored retroreflective article.

Wash Durability Tests:

The samples of Example 3 and Comparative Example C2 were washed using the method ISO 6330 2A. The results are shown in Table 2. Example 3 shows higher retroreflectivity retention after washing due to more glass beads being retained in the article.

TABLE 2

| Number of Wash Cycles | Retroreflectivity ($R_a$) | |
|---|---|---|
| | C2 | Example 3 |
| 0 | 539 | 599 |
| 5 | 422 | 543 |
| 10 | 362 | 479 |
| 15 | 305 | 456 |
| 20 | 278 | 417 |
| 25 | 242 | 379 |
| 30 | 220 | 358 |
| 35 | 206 | 308 |
| 40 | 192 | 270 |
| 45 | 178 | 253 |
| 50 | 168 | 204 |

EN 471 Test:

A sample of the retroreflective article prepared in Example 3 was testing according to the EN 471 protocol. EN 471 is a standard brightness test where measurements are made at different combinations of observation angle and entrance angle. The data are shown in Table 3 below. The sample of Example 3 meets the EN 471 protocol requirements.

TABLE 3

| Observation Angle (°) | Entrance Angle (°) | Minimum $R_a$ | Example 3 $R_a$ |
|---|---|---|---|
| 0.2 | 5 | 330 | 606 |
| 0.2 | 5 | 330 | 607 |
| 0.2 | 20 | 290 | 548 |
| 0.2 | 20 | 290 | 532 |
| 0.2 | 30 | 180 | 412 |
| 0.2 | 30 | 180 | 358 |
| 0.2 | 40 | 65 | 190 |
| 0.2 | 40 | 65 | 145 |
| 0.333 | 5 | 250 | 384 |
| 0.333 | 5 | 250 | 383 |
| 0.333 | 20 | 200 | 358 |
| 0.333 | 20 | 200 | 351 |
| 0.333 | 30 | 170 | 282 |
| 0.333 | 30 | 170 | 259 |
| 0.333 | 40 | 60 | 142 |
| 0.333 | 40 | 60 | 115 |
| 1 | 5 | 25 | 51.2 |
| 1 | 5 | 25 | 49.6 |
| 1 | 20 | 15 | 45.2 |
| 1 | 20 | 15 | 40.8 |
| 1 | 30 | 12 | 36.8 |
| 1 | 30 | 12 | 31.7 |
| 1 | 40 | 10 | 22.4 |
| 1 | 40 | 10 | 20.4 |
| 1.5 | 5 | 10 | 16.9 |
| 1.5 | 5 | 10 | 16.0 |
| 1.5 | 20 | 7 | 17.1 |

TABLE 3-continued

| Observation Angle (°) | Entrance Angle (°) | Minimum $R_a$ | Example 3 $R_a$ |
|---|---|---|---|
| 1.5 | 20 | 7 | 14.7 |
| 1.5 | 30 | 5 | 15.5 |
| 1.5 | 30 | 5 | 14.5 |
| 1.5 | 40 | 4 | 11.5 |
| 1.5 | 40 | 4 | 10.8 |

Example 4 and Comparative Example C3

Sample Fabrication:

The retroreflective article for Example 4 was prepared using the following multi-step procedure. For Comparative Example C3, a sample of Comp-1 was used.

A protective coating layer was prepared by coating a Colored Coating Layer and Clear Coating Layer.

Color Coating Solution:

The Color Coating Solution was prepared by mixing together 2.13 grams of Colorant-4, 4.55 grams of ST-PUD-1, and 4.4 grams of water to form a 24% solids solution.

Clear Coating Solution:

The Clear Coating Solution was prepared by mixing together 2.3 grams of Polyol-1, 1.09 grams of PI-1, 0.25 grams of Silane-1, 0.25 grams of Silane-2, 0.2 grams of Cat-1, and 8.9 grams of EA to form a 30% solids solution.

The Colored Coating Solution prepared above was coated on a sample of the glass bead layer prepared in Synthesis Example S2 with a notch bar coater with a coating gap set at 51 micrometers (2 mils). The coating was dried at 65° C. (149° F.) for 3 min, followed by 90° C. (194° F.) for 2 min After this the Clear Coating Solution prepared above was coated on the dried Colored Coating Solution layer using a notch bar coater with a 38 micrometer (1.5 mil) gap. The coating was dried at 65° C. (149° F.) for 3 min, followed by 90° C. (194° F.) for 2 min.

The coated glass bead layer was vapor coated with a thin layer of silver metal to from a silver metal mirror layer.

A colored bead bond composition was prepared as a 50% solids composition by mixing together the components shown in Table A.

TABLE A

| Component | Amount (parts by weight) |
|---|---|
| PE-1 | 60.6 |
| PE-2 | 10.88 |
| Silane-3 | 1.21 |
| Colorant-3 | 6.93 |
| PI-2 | 2.43 |
| Cat-2 | 0.121 |
| MEK | 10.88 |
| MIBK | 6.93 |

After vapor coating, the sample was coated with the Bead Bond composition described above, followed by a thermal treatment for 30 seconds at 71° C. (160° F.), and for 3 min at 82° C. (180° F.).

The exposed surface of the Bead Bond layer was laminated to an adhesive layer coated on an aramid fabric. The adhesive layer was Adhesive-1 and had a wet coating thickness of 0.23 mm (9 mils). The lamination was performed at approximately 104° C. (220° F.) and 70 psi (482 MPa) pressure.

Following the lamination process, the carrier layer was stripped away, exposing the previously embedded surfaces of the monolayer of glass microspheres to produce a colored retroreflective article:

Wash DurabilityTests:

The samples of Example 4 and Comparative Example C3 were washed using the method ISO 6330 2A. The results are shown in Table 4. Example 4 shows higher retroreflectivity retention after washing due to more glass beads being retained in the article.

TABLE 4

| Number of Wash Cycles | Retroreflectivity ($R_a$) | |
|---|---|---|
|  | C3 | Example 4 |
| 0 | 530 | 621 |
| 5 | 452 | 508 |
| 10 | 389 | 450 |
| 15 | 330 | 421 |
| 20 | 295 | 359 |
| 25 | 265 | 306 |
| 30 | 240 | 274 |
| 35 | 210 | 234 |
| 40 | 200 | 202 |
| 45 | 182 | 172 |
| 50 | 162 | 165 |

Example 5 and Comparative Example C4

Sample Fabrication:

The retroreflective article for Example 5 was prepared using the following multi-step procedure. For Comparative Example C4, the same procedure was followed except that the Protective Coating Solution was not applied.

A multi-layer coating layer was prepared by coating a Colored Coating Layer, a Clear Coating Layer, and a Protective Coating Layer.

Protective Coating Solution:

The Protective Coating Solution was prepared by mixing together 3.0 grams of PUD-1, 0.05 grams of Silane-1, and 18.0 grams of ethanol to form a 5% solids solution.

Color Coating Solution:

The Color Coating Solution was prepared by mixing together 2.5 grams of Colorant-4, 4.7 grams of PUD-1, 0.05 grams of Silane-2, and 4.8 grams of water to form a 24% solids solution.

Clear Coating Solution:

The Clear Coating Solution was prepared by mixing together 4.3 grams of Polyol-1, 1.09 grams of PI-3, 0.17 grams of Silane-2, 0.0037 grams of Cat-1, and 12.6 grams of EA to form a 30% solids solution.

For Example 5, the Protective Coating Solution prepared above was coated on a sample of the glass bead layer prepared in Synthesis Example S2 with a notch bar coater with the coating gap set at 51 micrometers (2 mils). The coating was dried at 65° C. (149° F.) for 3 min, followed by 90° C. (194° F.) for 2 min. To this dried layer the Colored Coating Solution prepared above was coated on the Protective Coating Solution layer with a notch bar coater with the coating gap set at 51 micrometers (2 mils). The coating was dried at 65° C. (149° F.) for 3 min, followed by 90° C. (194° F.) for 2 min. After this the Clear Coating Solution prepared above was coated on the dried Colored Coating Solution layer using a notch bar coater with the coating gap set at 38 micrometer (1.5 mil). The coating was dried at 65° C. (149° F.) for 3 min, followed by 90° C. (194° F.) for 2 min.

For Comparative Example C4, the Colored Coating Solution prepared above was coated on a sample of the glass bead layer prepared in Synthesis Example S2 with a notch bar coater with the coating gap set at 51 micrometers (2 mils). The coating was dried at 65° C. (149° F.) for 3 min, followed by 90° C. (194° F.) for 2 min. After this the Clear Coating Solution prepared above was coated on the dried Colored Coating Solution layer using a notch bar coater with the coating gap set at 38 micrometer (1.5 mil). The coating was dried at 65° C. (149° F.) for 3 min, followed by 90° C. (194° F.) for 2 min.

The samples of coated glass bead layers (Example 5 and Comparative Example C4) were vapor coated with a thin layer of silver metal to from silver metal mirror layers.

A colored bead bond composition was prepared as a 50% solids composition by mixing together the components shown in Table A.

TABLE A

| Component | Amount (parts by weight) |
| --- | --- |
| PE-1 | 60.6 |
| PE-2 | 10.88 |
| Silane-3 | 1.21 |
| Colorant-3 | 6.93 |
| PI-2 | 2.43 |
| Cat-2 | 0.121 |
| MEK | 10.88 |
| MIBK | 6.93 |

After vapor coating, the sample was coated with the Bead Bond composition described above, followed by a thermal treatment for 30 seconds at 71° C. (160° F.), and for 3 min at 82° C. (180° F.).

The exposed surface of the Bead Bond layer was laminated to an adhesive layer coated on an aramid fabric. The adhesive layer was Adhesive-1 and had a wet coating thickness of 0.23 mm (9 mils). The lamination was performed at approximately 104° C. (220° F.) and 70 psi (482 MPa) pressure.

Following the lamination process, the carrier layer was stripped away, exposing the previously embedded surfaces of the monolayer of glass microspheres to produce a colored retroreflective article.

Wash Durability Tests:

The samples of Example 5 and Comparative Example C4 were washed using the method ISO 6330 2A. The results are shown in Table 5. Example 5 shows higher retroreflectivity retention after washing due to more glass beads being retained in the article.

TABLE 5

| Number of Wash Cycles | Retroreflectivity ($R_a$) | |
| --- | --- | --- |
| | Comparative Example C4 | Example 5 |
| 0 | 384 | 433 |
| 5 | 264 | 317 |
| 10 | 216 | 231 |
| 15 | 168 | 215 |
| 20 | 123 | 190 |
| 25 | 72 | 186 |
| 30 | — | 153 |
| 35 | — | 117 |
| 40 | — | 113 |
| 45 | — | 94 |
| 50 | — | 70 |

Example 6

Sample Fabrication:

The retroreflective article of Example 6 was prepared using the following multi-step procedure.

A protective coating solution was prepared by mixing together 5.0 grams of ST-PUD-2, 30 grams of water, 27 grams of isopropanol, and 3 grams of diethylene glycoly monoethyl ether to form a 3% solids solution.

The coating solution prepared above was coated on a sample of the glass bead layer prepared in Synthesis Example S2 with a coating bar gap set at 51 micrometers (2 mils). The coating was dried at 65° C. (149° F.) for 3 min, followed by 90° C. (194° F.) for 2 min.

The sample of coated glass bead layer was vapor coated with a thin film dielectric stack consisting of alternating layers of ZnS and $CaF_2$ using an electron-beam evaporation method. A total of five layers were deposited using a Temescal (Livermore, Calif.) electron beam gun in a Denton (Moorestown, N.J.) batch coater operating at a base pressure of approximately 0.5 mPa. The individual layer thickness was targeted at an optical quarter-wave at a reference wavelength of 550 nm. The corresponding physical thickness is given by t=550 nm/(4*n), where n is the respective refractive index at 550 nm. The refractive indices for each layer were determined by ellipsometry and spectrophotometry. For Example 6 a total of five quarter-wave layers (ZnS, $CaF_2$, ZnS, $CaF_2$, ZnS) were deposited.

A colored bead bond composition was prepared as a 50% solids composition by mixing together the components shown in Table A.

TABLE A

| Component | Amount (parts by weight) |
| --- | --- |
| PE-1 | 60.6 |
| PE-2 | 10.88 |
| Silane-3 | 1.21 |
| Colorant-3 | 6.93 |
| PI-2 | 2.43 |
| Cat-2 | 0.121 |
| MEK | 10.88 |
| MIBK | 6.93 |

After vapor coating, the sample was coated with the Bead Bond composition described above, followed by a thermal treatment for 30 seconds at 71° C. (160° F.), and for 3 min at 82° C. (180° F.).

The exposed surface of the Bead Bond layer was laminated to an adhesive layer coated on an aramid fabric. The adhesive layer was Adhesive-1 and had a wet coating thickness of 0.23 mm (9 mils). The lamination was performed at approximately 104° C. (220° F.) and 70 psi (482 MPa) pressure.

Following the lamination process, the carrier layer was stripped away, exposing the previously embedded surfaces of the monolayer of glass microspheres to produce a colored retroreflective article.

Wash Durability Tests:

The sample of Example 6 was washed using the method ISO 6330 2A. The results are shown in Table 6. Example 6 shows good wash durability.

TABLE 6

| Number of Wash Cycles | Retroreflectivity ($R_a$) Example 6 |
|---|---|
| 0 | 423 |
| 5 | 304 |
| 10 | 272 |
| 15 | 229 |
| 20 | 212 |
| 25 | 188 |
| 30 | 162 |
| 35 | 143 |
| 40 | 126 |
| 45 | 107 |
| 50 | 93 |

What is claimed is:

1. A retroreflective article comprising:
a layer of optical elements, the optical elements consisting essentially of:
transparent microspheres, a transparent polymeric polyurethane layer disposed on the transparent microspheres, and at least one reflective layer, wherein the reflective layer is disposed on the transparent polymeric polyurethane layer; and
a bead bond layer, wherein the transparent polymeric polyurethane layer comprises a dried layer prepared from an aqueous polyurethane dispersion.

2. The retroreflective article of claim 1, wherein the aqueous polyurethane dispersion comprises a functionalized polyurethane.

3. The retroreflective article of claim 2, wherein the functionalized polyurethane comprises a silane terminated polyurethane.

4. The retroreflective article of claim 1, wherein the aqueous polyurethane dispersion further comprises dispersed pigment particles and the transparent polymeric polyurethane layer comprises a colored transparent polymeric polyurethane layer.

5. The retroreflective article of claim 4 wherein the pigment particles comprise nanopigment particles.

6. The retroreflective article of claim 1, wherein the aqueous polyurethane dispersion further comprises one or more additives, the additives comprising silane-functional compounds, pigments, dyes, UV stabilizers, antioxidants, UV absorbers, property modifiers, performance enhancers, or combinations thereof.

7. The retroreflective article of claim 6, wherein the additive comprises a silane-functional compound comprising a bi-functional silane.

8. The retroreflective article of claim 1, wherein the transparent polymeric polyurethane layer has a thickness of from 0.1 to 100 micrometers.

9. The retroreflective article of claim 1, wherein the reflective layer comprises a reflective metal layer comprising a layer of layer of aluminum, silver, or a combination thereof, or a multi-layer dielectric reflective layer comprising a layer of $SiO_2$, cryolite, $TiO_2$, $CaF_2$, $MgF_2$, ZnS, $Nb_2O_5$, $Ta_2O_5$, $ZrO_2$, or a combination thereof.

10. The retroreflective article of claim 9, wherein the reflective layer comprises a multi-layer dielectric reflective layer and wherein the retroreflectivity of retroreflective article is greater than the retroreflectivity of an article with same multi-layer dielectric reflective layer and no transparent polymeric polyurethane layer.

11. The retroreflective article of claim 9, wherein the reflective layer comprises a multi-layer dielectric reflective layer and wherein the multi-layer dielectric reflective layer has a reduced dichroic effect than an article with same multi-layer dielectric reflective layer and no transparent polymeric polyurethane layer.

12. The retroreflective article of claim 9, wherein the transparent polymeric polyurethane layer functions as a low refractive index layer of the multi-layer dielectric reflective layer.

13. The retroreflective article of claim 1, wherein the article is wash durable.

14. The retroreflective article of claim 4, wherein the colored transparent polymeric polyurethane layer is a colorfast layer.

15. An article of clothing comprising:
a fabric with a first major surface and a second major surface; and
a retroreflective appliqué attached to the first major surface of the fabric, the retroreflective appliqué comprising:
a layer of optical elements, the optical elements consisting essentially of:
transparent microspheres, a transparent polymeric polyurethane layer disposed on the transparent microspheres, and at least one reflective layer, wherein the reflective layer
is disposed on the transparent polymeric polyurethane layer; and
a bead bond layer, wherein the transparent polymeric polyurethane layer comprises a dried layer prepared from an aqueous polyurethane dispersion.

16. A method of preparing a retroreflective article comprising:
providing a polymeric carrier layer with a first major surface and a second major surface;
providing transparent microspheres;
partially embedding the transparent microspheres into the first major surface of the polymeric carrier layer such that the beads at least partially protrude from the first major surface of the polymeric carrier layer to form a layer of microspheres;
depositing a coating composition comprising a an aqueous polyurethane dispersion on the layer of microspheres;
drying the coating composition to form a transparent polyurethane polymeric layer on the layer of transparent microspheres;
depositing one or more reflective layers on at least a portion of the first major surface of the polymeric carrier layer and the layer of microspheres;
applying a bead bond layer to the layer of microspheres; and
removing the polymeric carrier layer.

17. The method of claim 16, wherein the aqueous polyurethane dispersion comprises a functionalized polyurethane.

18. The method of claim 17, wherein the functionalized polyurethane comprises a silane terminated polyurethane.

19. The method of claim 16, wherein the aqueous polyurethane dispersion further comprises one or more additives, the additives comprising silane-functional compounds, pigments, dyes, UV stabilizers, antioxidants, UV absorbers, property modifiers, performance enhancers, or combinations thereof.

20. The method of claim 19, wherein the additive comprises a silane-functional compound comprising a bi-functional silane.

21. The method of claim 16, wherein the transparent polymeric polyurethane layer has a thickness of from 0.1 to 100 micrometers.

22. The method of claim 16, wherein the reflective layer comprises a reflective metal layer comprising a layer of layer of aluminum, silver, or a combination thereof, or a dielectric reflective layer comprising a layer of $SiO_2$, cryolite, $TiO_2$, $CaF_2$, $MgF_2$, ZnS, $Nb_2O_5$, $Ta_2O_5$, $ZrO_2$, or a combination thereof.

23. An article comprising:
a polymeric carrier layer with a first major surface and a second major surface;
a layer of optical elements, partially embedded in the first major surface of the polymeric carrier layer, the optical elements consisting essentially of:
transparent microspheres, a transparent polymeric polyurethane layer disposed on the transparent microspheres, and at least one reflective layer, wherein the reflective layer is disposed on the transparent polymeric polyurethane layer; and
a bead bond layer disposed on the reflective layer, wherein the transparent polymeric polyurethane layer comprises a dried layer prepared from an aqueous polyurethane dispersion.

* * * * *

UNITED STATES PATENT AND TRADEMARK OFFICE
CERTIFICATE OF CORRECTION

PATENT NO. : 10,545,268 B2
APPLICATION NO. : 15/308853
DATED : January 28, 2020
INVENTOR(S) : Ying Xia Page 1 of 2

It is certified that error appears in the above-identified patent and that said Letters Patent is hereby corrected as shown below:

In the Specification

<u>Column 2</u>
Line 40, delete "a an" and insert -- an --, therefor.

<u>Column 11</u>
Line 5, delete "retardency." and insert -- retardancy. --, therefor.

<u>Column 16</u>
Line 2, delete "retardency," and insert -- retardancy, --, therefor.
Line 44, delete "and or" and insert -- and/or --, therefor.

<u>Column 20</u>
Line 19, delete "a an" and insert -- an --, therefor.

<u>Column 23 (Table of Abbreviations-Continued)</u>
Line 13, delete "Methy" and insert -- Methyl --, therefor.

<u>Column 30</u>
Line 18, delete "glycoly" and insert -- glycol --, therefor.

In the Claims

<u>Column 31</u>
Line 61, in Claim 9, delete "layer of layer of" and insert -- layer of --, therefor.

<u>Column 32</u>
Line 48, in Claim 16, delete "a an" and insert -- an --, therefor.

Signed and Sealed this
Third Day of March, 2020

Andrei Iancu
*Director of the United States Patent and Trademark Office*

Column 33
Lines 11-12, in Claim 22, delete "layer of layer of" and insert -- layer of --, therefor.